INVENTOR
Harvey L. Ratliff Jr.

INVENTOR

Harvey L. Ratliff Jr.

INVENTOR

Harvey L. Ratliff Jr.

INVENTOR
Harvey L. Ratliff Jr.

INVENTOR
Harvey L. Ratliff Jr.

INVENTOR
Harvey L. Ratliff Jr.

INVENTOR
Harvey L. Ratliff Jr.

INVENTOR
Harvey L. Ratliff Jr.

INVENTOR
Harvey L. Ratliff Jr.

Dec. 26, 1967 H. L. RATLIFF, JR 3,360,606

STEREOPHONIC SYSTEMS

Filed June 12, 1963 13 Sheets-Sheet 10

INVENTOR

Harvey L. Ratliff Jr.

INVENTOR
Harvey L. Ratliff Jr.

INVENTOR
Harvey L. Ratliff Jr.

INVENTOR
Harvey L. Ratliff Jr.

United States Patent Office
3,360,606
Patented Dec. 26, 1967

3,360,606
STEREOPHONIC SYSTEMS

Harvey L. Ratliff, Jr., Amarillo, Tex., assignor of one hundred percent to Jetru Inc., Amarillo, Tex.
Filed June 12, 1963, Ser. No. 287,338
3 Claims. (Cl. 179—1)

This invention relates to recording and reproducing stereophonic sound in conjunction with wide angle stereoscopic motion pictures. It is the practice in the stereophonic sound arts to record and reproduce only two directional components of sound. Some attempts have been made to record and reproduce every component of sound but it is considered that there is much room for improvement in the art of recording and reproducing every directional component of sound.

It is accordingly the principal object of this invention to teach a novel process and apparatus for recording and reproducing every directional component of sound which is a definite improvement over the prior art, which is practical, and relatively economical.

In wide angle stereoscopic motion pictures the angle of view is so great that a viewing observer may at times find it hard to direct his attention to the center of interest. It is therefore considered, at times, desirable to give the "background" music any one of the infinite number of directional components of sound possible when every directional component of sound is recorded and reproduced. Also in wide angle stereoscopic motion pictures, at times, the actors will be too far from the "camera" for its associated microphones to pick up their dialogues. Under these conditions it is considered desirable to record their dialogue by the use of "directional microphones" and a single "sound track" and to give this dialogue the proper resultant directional component later.

It is accordingly another object of this invention to teach a novel process and apparatus for recording sound on a single sound track and later giving this sound substantially every directional component of sound while reproducing it in a "directional mixing room" along with the reproduction of the sound which has been directionally recorded while directionally recording and monitoring the sound reproduced in said "directional mixing room."

In the art of stereophonic sound it is considered, at times, desirable to record the directional components of sound on some number of sound tracks (say four) by this number of microphones (say four) arranged in a first relationship and to reproduce the recorded sound from another "basic number" of speakers having a completely different second relationship.

It is accordingly a further object of this invention to teach a novel process and apparatus for recording substantially any of the existing directional components of sound by a group of microphones having a first relationship and reproducing the sound from a group of speakers which have a completely different second relationship.

In the reproduction of wide angle stereoscopic motion pictures with their associated stereophonic sound for an audience of viewing observers it is very desirable that each viewing observer be comfortable and free to move from one position to another. It is also considered desirable to reproduce the image and most of the directional components of sound directly adjacent each individual viewing observer.

It is accordingly still a further object of this invention to teach a unique and economical apparatus for placing most of the directional components of the reproduced sound and the reproduced wide-angle stereoscopic image immediately adjacent each viewing observer without requiring any viewing observer to wear anything or to mount anything on his (or her) head, while allowing him (or her) relatively complete freedom of movement from one position to another for relaxed comfortable observation.

Other objects and advantages of my invention will become more apparent from a study of the following description taken with the accompanying drawings wherein:

FIG. 13(*a*) is a front view of the individual KD set of the invention similar to that of FIG. 13 showing an alternate speaker arrangement.

FIG. 14(*a*) is an elevational view showing the arrangement of FIG. 13(*a*).

Figures 1, 2, 3:
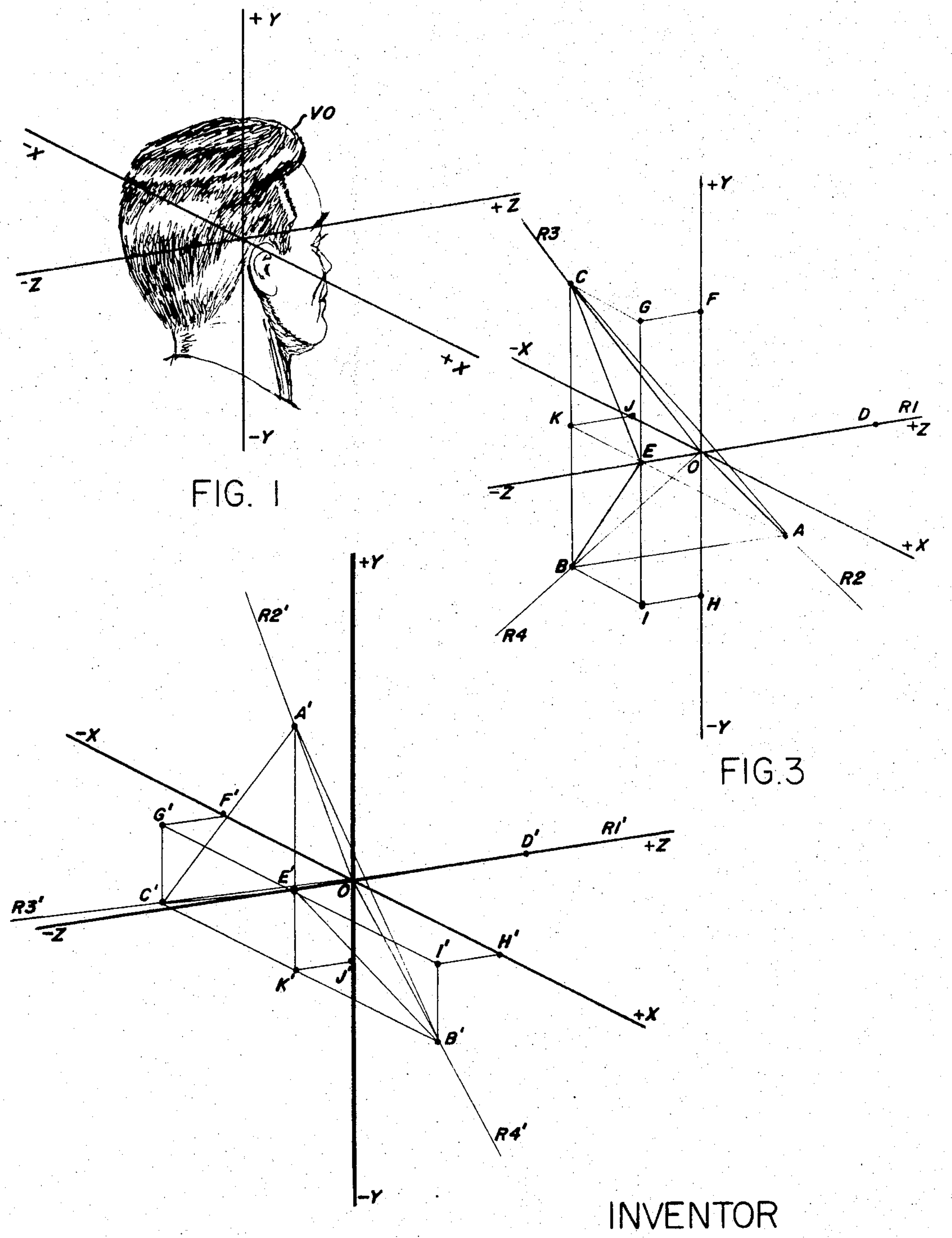
FIGS. 1–3 are elevational views showing spatial concepts fundamental to the invention.

Referring more particularly to the drawings, reference is made to FIG. 1. For the purposes of describing the present invention it will be considered that every sound which emanates from various sources surrounding a viewing observer (VO observing any action scene) as being resolved into six components (+Z, −Z, +X, −X, +Y, and −Y as shown in FIG. 1) at any given instant of time. The first component (+Z) is moving toward said viewing observer VO horizontally, in front of, and along the axis of view of said viewing observer. The second component (−Z) is moving toward said viewing observer VO horizontally, from the rear of, and along the axis of view of said viewing observer. The third component (+X) is moving toward said viewing observer VO horizontally, from his right, and along an axis which is perpendicular to said axis of view. The fourth component (−X) is moving toward said viewing observer VO horizontally, from his left, and along said axis which is perpendicular to said axis of view. The fifth component (+Y) is moving toward said viewing observer VO vertically, downward, and along an axis which is perpendicular to said axis of view. The sixth component (−Y) is moving toward said viewing observer VO vertically, upward, and along said axis which is perpendicular to said axis of view. The axis of each of said six components intersect at origin (0) which is on said axis of view and half way between the two ears of (VO). It is considered that any audible sound originating from any point or source surrounding (VO) may be resolved into one or more of said six components.

Referring now to FIG. 3, if the first recording instrument is placed at point D such that R1 is its recording axis, the second recording instrument is placed at point A such that R2 is its recording axis, the third recording instrument is placed at point C such that R3 is its recording axis, and the fourth recording instrument is placed at point B such that R4 is its recording axis; the sound recorded by the first instrument at D is considered to be only the (+Z) component of sound of magnitude ($a1$); the sound recorded by the second instrument at A is considered to be two components (+X) of magnitude $$\left[\left(\frac{AE}{OD}\right)(a2)\right]$$

and (−Z) of magnitude $$\left[\left(\frac{EO}{OD}\right)(a2)\right]$$

the sound recorded by the third instrument at C is considered to be three components (−Z) of magnitude $$\left[\left(\frac{EO}{OD}\right)(a3)\right]$$

(+Y) of magnitude $$\left[\left(\frac{OF}{OD}\right)(a3)\right]$$

and (−X) of magnitude $$\left[\left(\frac{JO}{OD}\right)(a3)\right]$$

the sound recorded by the fourth instrument of B is considered to be three components (−Z) of magnitude $$\left[\left(\frac{EO}{OD}\right)(a4)\right]$$

(−Y) of magnitude $$\left[\left(\frac{HO}{OD}\right)(a4)\right]$$

and (−X) of magnitude $$\left[\left(\frac{JO}{OD}\right)(a4)\right]$$

Of course the recording instruments can be oriented differently such as shown by D′, A′, C′, B′, of FIG. 2.

At this point the six components of the sound recorded by each recording instrument will be defined. The +Z, −Z, +X, −X, +Y, and −Y components of sound recorded on axis R1 will be defined as +Z1, −Z1, +X1, −X1, +Y1, and −Y1 respectively, on axis R2 will be defined as +Z2, −Z2, +X2, −X2, +Y2, and −Y2 respectively, on axis R3 will be defined as +Z3, −Z3, +X3, −X3, +Y3, and −Y3 respectively, and on axis R4 will be defined as +Z4, −Z4, +X4, −X4, +Y4, and −Y4 respectively.

At this point RS (which is a single resultant component of sound) will be defined. RS is the vectorial sum of +Z1, −Z1, +X1, −X1, +Y1, −Y1, +Z2, −Z2, +X2, −X2, +Y2, −Y2, +Z3, −Z3, +X3, −X3, +Y3, −Y3, +Z4, −Z4, +X4, −X4, +Y4, and −Y4. Also RS is in very close proximity to the vectorial sum of every sound emanating from every source surrounding VO. This later vectorial sum is of course what is desired (but probably not perfectly attainable). Obviously when RS is zero the resultant sound has no direction although it may be very intense, and when RS is high the resultant sound is very directional although it may be of relatively low intensity.

Of course the recording apparatus of applicant's invention may be arranged in other operative ways and be within the scope of this invention. But the contemplated mode of operation (illustrated in FIG. 3) will now be set forth:

(1) $(+Z1)=a1$
(2) $(-Z1)=<0$
(3) $(+X1)=0$
(4) $(-X1)=0$
(5) $(+Y1)=0$
(6) $(-Y1)=0$
(7) $(+Z2)=<0$
(8) $$(-Z2)=\left(\frac{EO}{OD}\right)(a2)$$
(9) $$(+X2)=\left(\frac{EA}{OD}\right)(a2)$$
(10) $(-X2)=<0$
(11) $(+Y2)=0$
(12) $(-Y2)=0$
(13) $(+Z3)=<0$
(14) $$(-Z3)=\left(\frac{EO}{OD}\right)(a3)$$
(15) $(+X3)=<0$
(16) $$(-X3)=\left(\frac{JO}{OD}\right)(a3)$$
(17) $$(+Y3)=\left(\frac{OF}{OD}\right)(a3)$$
(18) $(-Y3)=<0$
(19) $(+Z4)=<0$
(20) $$(-Z4)=\left(\frac{EO}{OD}\right)(a4)$$
(21) $(+X4)=<0$
(22) $$(-X4)=\left(\frac{JO}{OD}\right)(a4)$$
(23) $(+Y4)=<0$
(24) $$(-Y4)=\left(\frac{HO}{OD}\right)(a4)$$

Where $a1$, $a2$, $a3$, and $a4$ are the actual resultant sound amplitudes along R1, R2, R3, and R4 respectively at any given instant.

Said first, second, third, and fourth recording instruments are adjusted such that if:

$$a1=a2=a3=a4$$

each respective amplitude recorded will be equal and therefore RS would be zero upon reproduction later to thereby simulate reality.

Also—

| Angle: | Degrees |
|---|---|
| (25) ABC | 60 |
| (26) BCA | 60 |
| (27) CAB | 60 |

Further—

| Angle: | Degrees |
|---|---|
| (28) EOC | 70.55 |
| (29) EOA | 70.55 |
| (30) EOB | 70.15 |
| (31) OEC | 90 |
| (32) OEA | 90 |
| (33) OEB | 90 |

Also:

(34) Triangles OEC, OEA, and OEB are congruent.

Therefore:

(35) Distances OA, OC, and OB are equal.

Also:

(36) Distance OD=distance OA

Since condition (28) exists:

(37) Distance EO=1/3 (distance OD)

Therefore: If a sound is formed which resolves itself into *a*—Z component of amplitude (*b*), the magnitude of this —Z component of sound recorded by said second instrument along R2 would be 1/3(*b*), the magnitude of this —Z component of sound recorded by said third instrument along axis R3 would be 1/3(*b*), and the magnitude of this —Z component of sound recorded by said fourth instrument along Axis R4 would be 1/3(*b*). Therefore, the above described second recording instrument, third recording instrument, and fourth recording instrument each record exactly one third of the magnitude of the (—Z) component of each sound (in the contemplated form of the invention).

The above described first recording instrument is designed to record exactly all of the +Z component of each sound and no other component of sound in the contemplated form of the invention.

Because of conditions (25), (26), and (27):

(38) Distance EK=½ (distance EC)
(39) Distance EK=½ (distance EB)
(40) Distance EK=½ (distance EA)

Therefore:

(41) Distance KC=$\sqrt{3}$(distance EK)
(42) Distance KB=$\sqrt{3}$(distance EK)

But:

(43) Distance CE=(0.9428) (distance OC) [1]

Or:

(48) CE=(0.9428) (OD) [2]

Therefore:

(45) Distance KE=(0.4714) (OD) [3]
(46) Distance KC=(0.8165) (OD) [4]

Also:

(47) Distance KB=(0.8165) (OD)

[1] See condition (28).
[2] See conditions (35) and (36).
[3] See conditions (25), (26) and (27).
[4] See conditions (25), (26) and (27).

Therefore, the above described second recording instrument additionally records (0.9428) times the (+X) component of sound, none of the (—X) component of sound, none of the (+Y) component of sound, and none of the (—Y) component of sound. The above described third recording instrument additionally records (0.4714) times the (—X) component of sound, (0.8165) times the (+Y) component of sound, none of the (+X) component of sound, and none of the (—Y) component of sound. The above described fourth recording instrument additionally records (0.4714) times the (—X) component of sound, (0.8165) times the (—Y) component of sound, none of the (+X) component of sound, and none of the (+Y) component of sound.

Figures 4, 5:
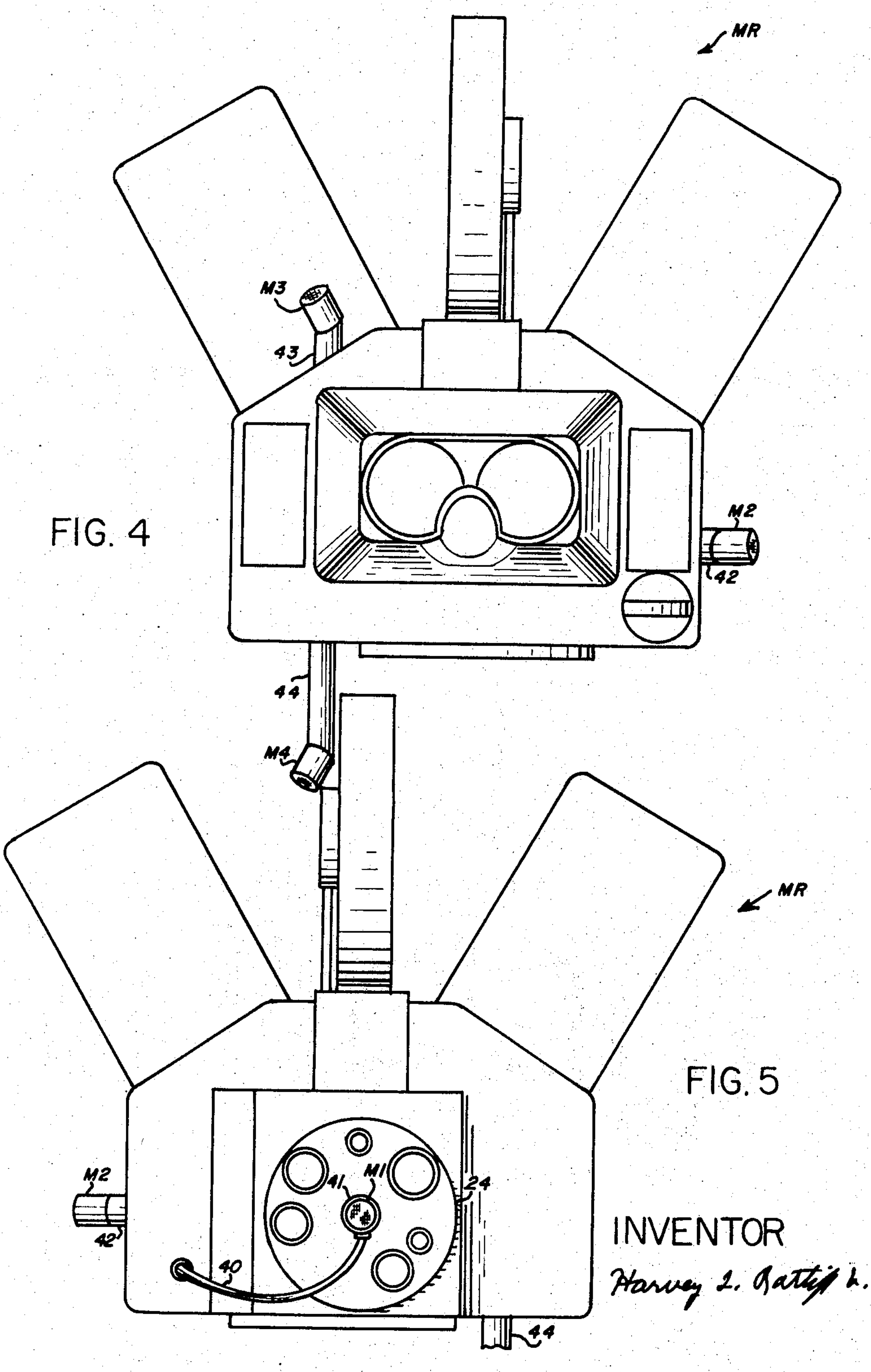
FIG. 4 is a rear view of a stereophonic recording apparatus of the invention.
FIG. 5 is a front view of the stereophonic recording apparatus of FIG. 4.

The contemplated apparatus for executing the recording process described above is illustrated in FIGS. 4 and 5. The (+Z) and (—Z) components are assumed to move on an axis which passes through the center of a first recording instrument M1 (see FIG. 5) and is parallel to the axis of the lenses mounted on turret 24. R1 is of course related to +Z as described above. The origin (0) is assumed to be a point on this (+Z) and (—Z) axis and directly over the center of the tripod supporting the monitoring recording device MR and described in my copending application numbered 275,411 filed April 24, 1963. Recording axes R2, R3, and R4 are related to origin (0) and R1 as described above. The second recording instrument M2 of FIG. 4 is of course placed at A (see FIG. 3) and supported by and wired through means 42. The third recording instrument M3 of FIG. 4 is placed at C (see FIG. 3) and supported by and wired through means 43. The fourth recording instrument M4 of FIG. 4 is placed at B (see FIG. 3) and supported by and wired through means 44. Distances OD, OA, OC, and OB are of course the distance between M1, M2, M3 and M4 respectively, and the latter described origin (0). It is contemplated that M1 be supported on turret 24 by a swivel means (of any well known operative type) so that it will not rotate with turret 24, and that M1 be wired through insulated cord 40 as shown; however the electrical connections between M1 and the sound track apparatus may be made in any well known manner. Of course the design purpose is that the recording axes of M2, M3, and M4 be R2, R3, and R4 respectively.

Figure 6:
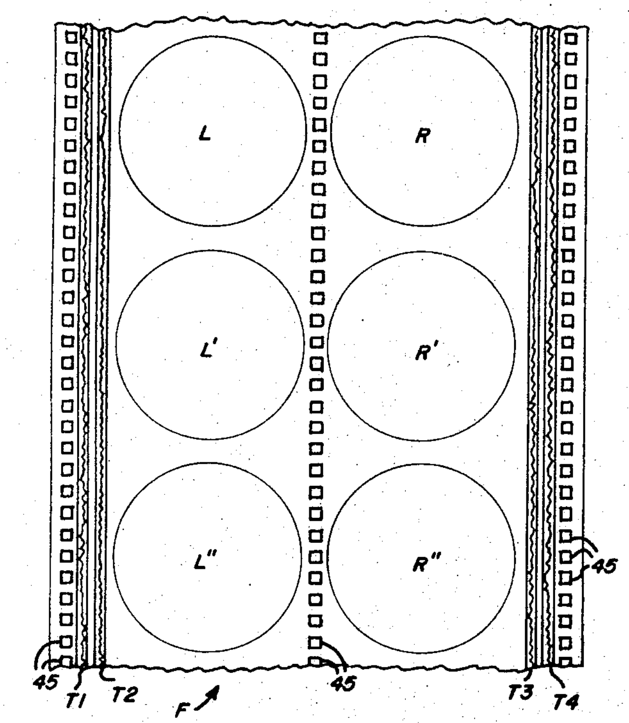
FIGS. 6–8 are diagrammatic views of various modes of recording the stereophonic sound involved in the invention.
Figure 7:
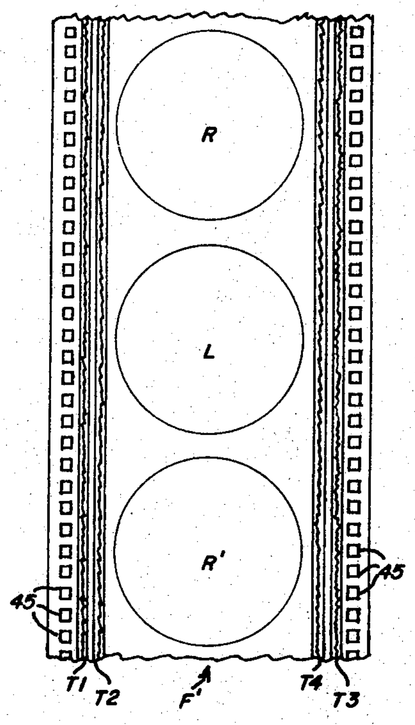
Figure 8:
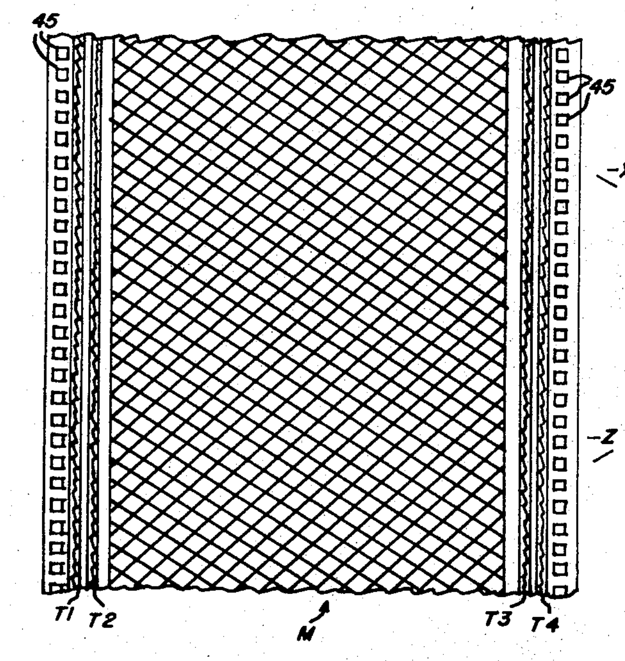

The signals from M1, M2, M3, and M4 are recorded on sound tracks T1, T2, T3, and T4 respectively in any operative well known manner (see FIGS. 6–8). The sound tracks may be on film F of FIG. 6, magnetic tape M of FIG. 8, or they may be on film F' of FIG. 7. In FIG. 6 the left eye view and the right eye view are recorded in a side by side relationship while in FIG. 7 one is recorded above the other. Perforations or sprocket holes 45 of course allow the film or tape to be moved through a reproduction means.

Figure 10:
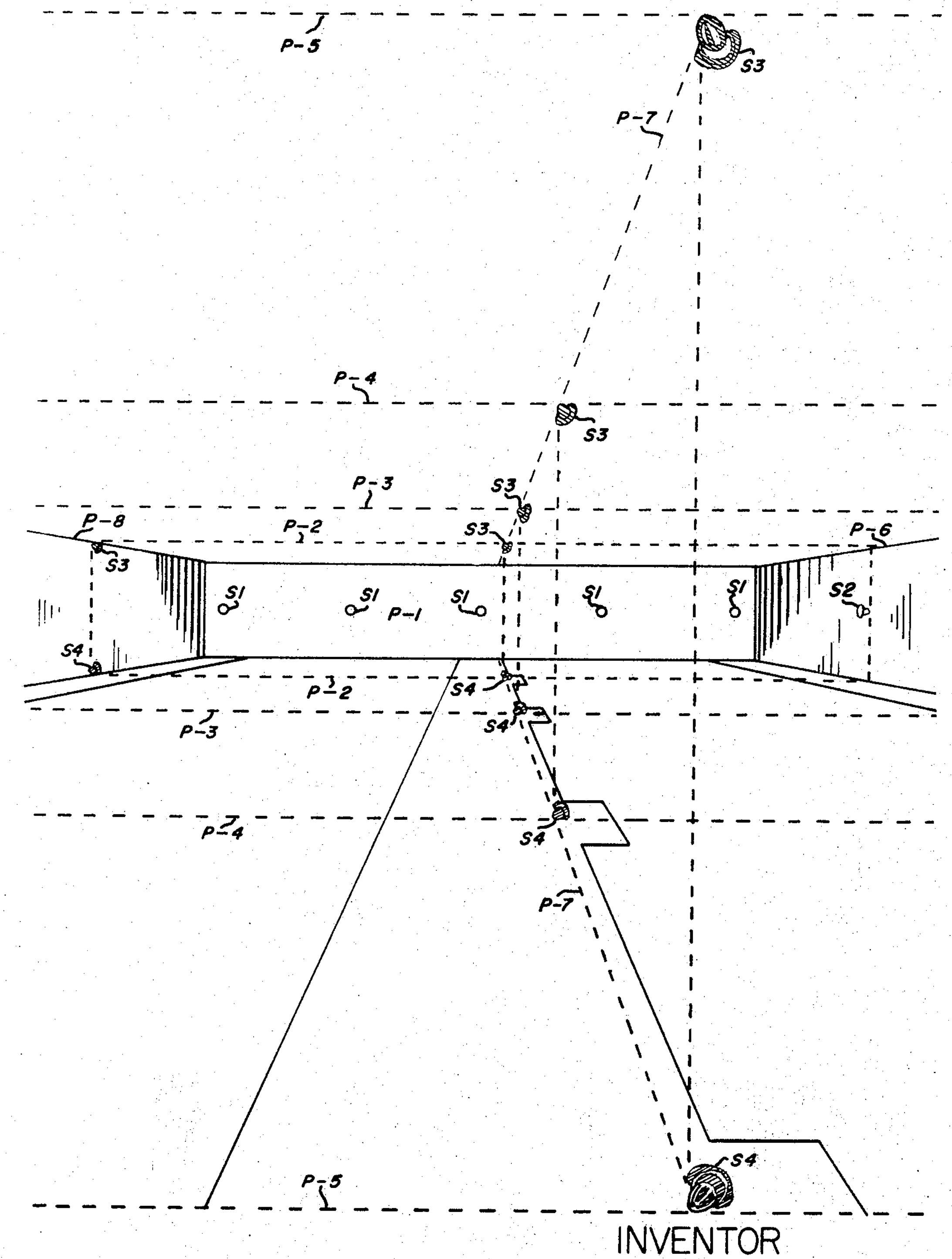
FIG. 10 is a perspective view of one stereophonic reproduction system involved in the invention.

Reference is now made to FIG. 10. One of the contemplated methods of reproducing the sound recorded on tracks T1, T2, T3 and T4 realistically will now be set forth. It is contemplated that each floor or level of the auditorium for wide-angle- stereoscopic- stereophonic observation will be approximately 8 feet high, have three or more aisles about 5 feet wide and seating areas about 15 feet wide. By way of example it is assumed that each level of the auditorium will be 8' x 50' x 100'. In order to define the stereophonic system the exemplifying level will be divided into eight imaginary planes P–1, P–2, P–3, P–4, P–5, P–6, P–7, and P–8. Plane P–1 is defined by the vertical front wall of the exemplifying level of FIG. 10. Plane P–2 is twenty-five feet to the rear of and parallel to plane P–1. Plane P–3 is twenty-five feet to the rear of and parallel to P–2. Plane P–4 is twenty-five feet to the rear of and parallel to P–3. Plane P–5 is twenty-five feet to the rear of and parallel to P–4. Plane P–6 is defined by the vertical right wall of the exemplifying level. Plane P–6 is of course perpendicular to planes P–1, P–2, P–3, P–4, and P–5. Plane P–7 is parallel to plane P–6 and slightly to the left of the right edge of the center aisle of the exemplifying level. Plane P–8 is defined by the left wall of said level which is of course parallel to plane P–7. The top of planes P–1, P–2, P–3, P–4, P–5, P–6, P–7, and P–8 is the ceiling of said level and the bottom is the floor of said level. On a horizontal line which bisects plane P–1 are placed some 5 speakers S1 which reproduce the sound recorded on track T1. The axis of sound of each speaker S1 is perpendicular to plane P–1 and directed toward plane P–5.

Speakers S1 thereby place the (+Z) component of sound in said level of the auditorium.

On a horizontal line which bisects plane P–6 are placed some four speakers S2 which reproduce the sound recorded on track T2, one speaker being in plane P–2, and in P–3, one in P–4, and one in P–5. The axis of sound of each of speakers S2 are in a plane which is parallel to the floor and the ceiling of said level and half way between them. The axis of sound of each of speaker S2 also makes angle DOA (see also FIG. 3) with plane P–6, where D is in front of each speaker. Speakers S2 thereby place ⅓ of the (—Z) component of sound and (0.9428) of the (+X) component of sound in said level of the auditorium.

Some four speakers S3 are placed at the top of plane P–7, one speaker being in plane P–2, one in P–3, one in P–4, and one in P–5. Some other four speakers S3 are placed at the top of plane P–8, one additional speaker being in plane P–2, one additional in P–3, one additional in P–4, and one additional in P–5. Speakers S3 reproduce the sound recorded on track T3. The axis of sound of each of the speakers S3 makes an angle CFO (see also FIG. 3) with the plane of the ceiling and the four in plane P–7 make an angle CJO (see also FIG. 3) with plane P–7 while the four in plane P–8 make an angle CJO (see also FIG. 3) with plane P–8. Speakers S3 thereby place an additional ⅓ of the (—Z) component of sound (0.4714), of the (—X) component of sound, and (0.8165) of the (+Y) component of sound in said level of the auditorium.

Some four speakers S4 are placed at the bottom of plane P–7, one speaker being in plane P–2, one in P–3, one in P–4, and one in P–5. Some other four speakers S4 are placed at the bottom of plane P–8, one additional speaker being in plane P–2, one additional in P–3, one additional in P–4, and one additional in P–5. Speakers S4 reproduce the sound recorded on track T4. The axis of sound of each of the speakers S4 makes an angle BHO (see also FIG. 3) with the plane of the floor and the four in plane P–7 make an angle BJO (see also FIG. 3) with plane P–7 while the four in plane P–8 make an angle BJO with plane P–8. Speakers S4 thereby place an additional ⅓ of the (—Z) component of sound, an additional (0.4714) of the (—X) component of sound, and (0.8165) of the (—Y) component of sound in said level of the auditorium.

It may now be seen that speakers S2, S3, and S4 work together to reproduce all of the (—Z) component of sound in said level of said auditorium, which is held in directional balance by all of the (+Z) component of sound which is reproduced by speakers S1. It may also now be seen that speakers S3 and S4 work together to reproduce (0.9428) of the (—X) component of sound which is held in directional balance by (0.9428) of the (+X) component of sound reproduced by speakers S2. It may also now be seen that speakers S3 reproduce (0.8165) of the (+Y) component of sound which is held in directional balance by (0.8165) of the (—Y) component of sound reproduced by speakers S4.

Obviously a person sitting in a first segment which is enclosed by planes P–1, P–2, P–6, and P–7 would hear the complete directional effect of speakers S1, S2, S3, and S4 working together. A person sitting in this first segment would have the full directional effect of every speaker S1, every speaker S2, every speaker S3, and every speaker S4. However, the rear speakers S2, S3, and S4 in plane P–5 would be so far away that they would add little of their respective recorded components of sound to the hearing of the person in this particular first segment. The speakers S2, S3, and S4 in plane P–2 of course add more of their respective (—Z) components of sound than those in plane P–3 which would add more than those in plane P–4 which would add more than those in plane P–5 to this first segment. The speakers S3 and S4 in plane P–7 of course add more of their respective (—X) components of sound than those in plane P–8 to this segment.

At this point seven other segments will be defined. The second segments is enclosed by planes P–2, P–3, P–6, and P–7. The third segment is enclosed by planes P–3, P–4, P–6 and P–7. The fourth segment is enclosed by planes P–4, P–5, P–6, and P–7. The fifth segment is enclosed by planes P–1, P–2, P–7, and P–8. The sixth segment is enclosed by planes P–2, P–3, P–7, and P–8. The seventh segment is enclosed by planes P–3, P–4, P–7 and P–8. The eighth segment is enclosed by planes P–4, P–5, P–7, and P–8.

In order to insure that said speakers S1, S2, S3, and S4 reproduce the directional components of sound as well as possible, the following described calibration procedure will be carried out on each level of the auditorium.

First the calibration instrument shown in FIGS. 9 and 12 will be described. Microphone 117 is designed to measure the +Z component of sound. Microphone 120 is designed to measure the —Z component of sound. Microphone 124 is designed to measure the +X component of sound. Microphone 128 is designed to measure the —X component of sound. Microphone 132 is designed to measure the +Y component of sound. And microphone 135 is designed to measure the —Y component of sound. Microphones 117 and 120 face exactly the opposite direction. Microphones 124 and 128 face exactly the opposite direction and both have a recording axis which is perpendicular to that of microphones 117 and 120. Microphones 132 and 135 face exactly the opposite direction and both have a recording axis which is perpendicular to that of microphones 117, 120, 124, and 128. Tubes 116, 119, 123, 127, 131, and 134 could be simple rectifier tubes or they could be triodes with their grids biased to plate current cut off (as shown by 118, 121, 126, 129, 133, 136). Calibration controls 137, 138, 139, 140, 141, and 142 are adjusted such that when the sound intensity reaching microphones 117, 120, 124, 128, 132, and 135 respectively is the same, the same current will pass through tubes 116, 119, 123, 127, 131, and 134 respectively. This is done in any obvious or well known manner. It may now be seen that under these conditions, when the intensity at 117 is greater than at 120, current will flow down through D.C. ammeter or galvanometer 115; when the intensity at 120 is greater than at 117, current will flow up through D.C. ammeter or galvanometer 115; when the intensity at 120 equals the intensity at 117, no current will flow through D.C. ammeter or galvanometer 115; when the intensity at 124 is greater than at 128 current will flow down through D.C. ammeter or galvanometer 122; when the intensity at 128 is greater thann at 124 current will flow up through ammeter 122; when the intensity at 128 is equal that of 124 no current will flow through ammeter 122; etc. (the same obvious reasoning applies to ammeter 130).

Microphone 117 is placed about 6″ from microphone 120. Microphone 124 is placed about 6″ from microphone 128. Microphone 132 is placed about 6″ from microphone 135, which is about the distance between the two ears of a viewing observer.

Figure 11:
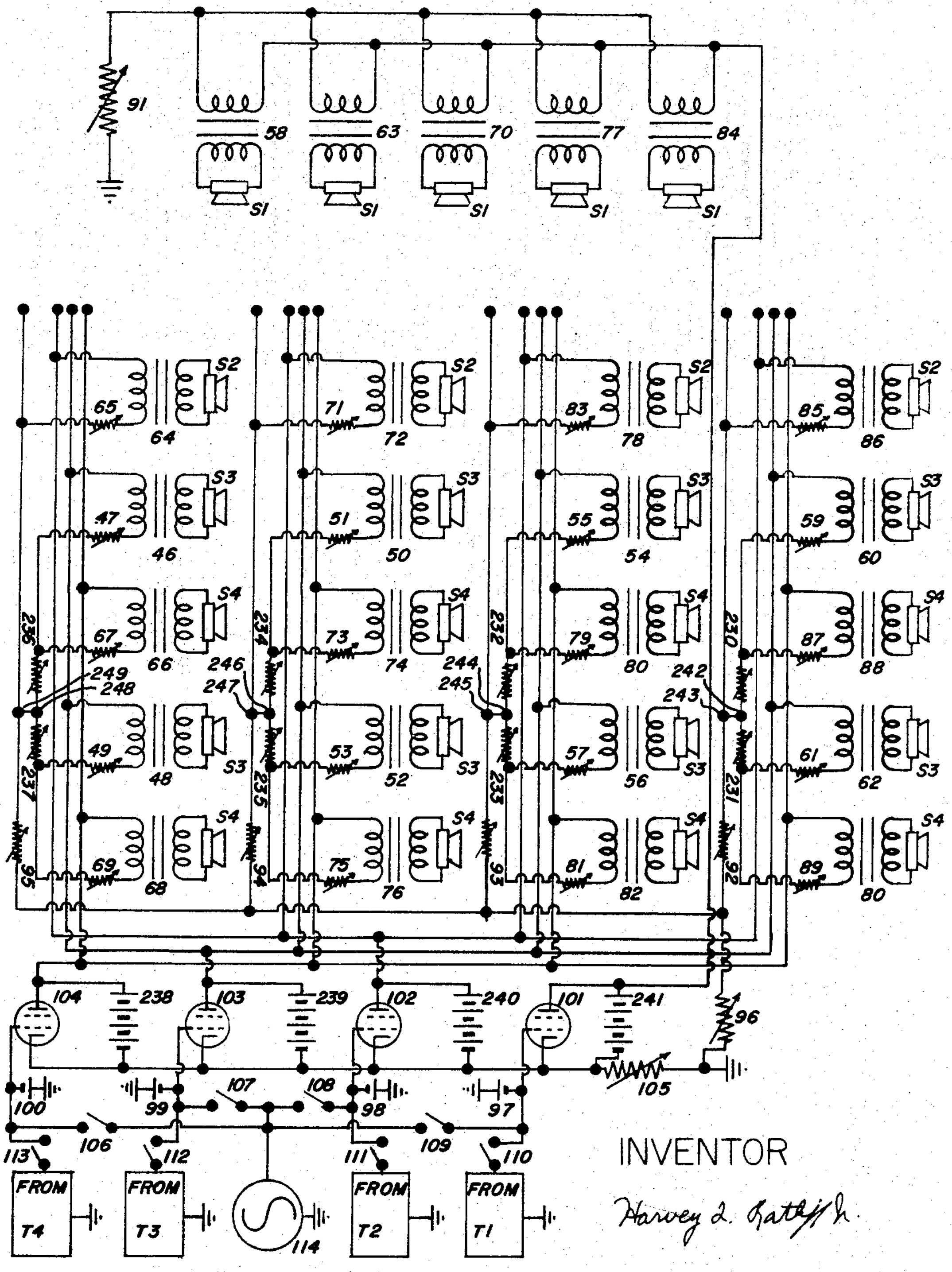
FIG. 11 is a schematic diagram of the electronic circuitry of the reproduction system of FIG. 10.

The electronic circuitry of the stereophonic system of FIG. 10 is schematically illustrated in FIG. 11. The audio signal from T1 is applied through switch 110 to the control grid of the first stage of amplifier system 101 (which consists of many amplifier tubes). The audio signal from T2 is applied through switch 111 to the control grid of the first stage of amplifier system 102 (which consists of many amplifier tubes. (The audio signal from T3 's applied through switch 112 to the control grid of the first stage of amplifier system 103 (which consists of many amplifier tubes). The audio signal from T4 is applied through switch 113 to control grid of the first stage of amplifier system 104). Each amplifier control grid has a well known biasing means indicated by 97, 98, 99 and 100.

The B+ supply voltage 241 is grounded on its negative end through general volume control 105 and properly applied at its positive end to the plate of each tube in amplifier system 101 in a well known manner. Each input coil of transformer 58, 63, 70, 77 and 84 for speakers S1 is connected to ground through calibrating volume control 91 at its negative end and to the plate of the final stage of amplifier system 101 at its positive end as shown.

The B+ supply 240 is grounded on its negative end through general volume control 105 and properly applied at its positive end to the plate of each tube in amplifier system 102 in a well known manner. The input coil of transformer 64 for the S2 speaker of plane P–2 is grounded at its negative end through calibrating volume controls 65, 96 and 95 and connected at its positive end to the plate of the final stage of amplifier system 102. The input coil of transformer 72 for the S2 speaker of plane P–3 is grounded at its negative end through calibrating volume controls 71, 94, and 96 and connected at its positive end to the plate of the final stage of amplifier system 102. The input coil of transformer 78 for the S2 speaker of plane P–4 is grounded at its negative end through calibrating volume controls 83, 93, and 96 and connected at its positive end to the plate of the final stage of amplifier system 102. In a similar manner 85, 92, and 96 each vary the voluem of the S2 speaker of plane P–5; 47, 236, 95, and 96 all vary the volume of the S3 speaker in planes P–2 and P–7; 51, 234, 94, and 96 all vary the volume of the S3 speaker in planes P–3 and P–7; 55, 232, 93, and 96 all vary the volume of the S3 speakers in planes P–4 and P–7; 59, 230, 92, and 96 all vary the volume of the S3 speaker in planes P–5 and P–7; 67, 236, 95, and 96 all vary the volume of the S4 speaker in planes P–2 and P–7; 73, 234, 94, and 96 all vary the volume of the S4 speaker in planes P–3 and P–7; 79, 232, 93, and 96 all vary the volume in the S4 speaker in planes P–4 and P–7; 87, 230, 92, and 96 all vary the volume of the S4 speaker in planes P–5 and P–7; 49, 237, 95, and 96 all vary the volume in the S3 speakers in planes P–2, and P–8; 53, 235, 94, and 96 all vary the volume of the S3 speaker in planes P–3 and P–8; 57, 233, 93, and 96 all vary the volume of the S3 speaker in planes P–4 and P–8; 61, 231, 92, and 96 all vary the volume of the S3 speaker in planes P–5 and P–8; 69, 237, 95, and 96 all vary the volume of the S4 speaker in planes P–2 and P–8; 75, 235, 94, and 96 all vary the volume of the S4 speaker in planes P–3 and P–8; 81, 233, 93, and 96 all vary the volume of the S4 speaker in planes P–4 and P–8; and 89, 231, 92, and 96 all vary the volume of the S4 speaker in planes P–5 and P–8. Also volume control 105 is connected such as to control the volume of every speaker. Of course the B+ supply voltages 239 and 238 are properly applied to the plate of each tube of amplifier systems 103 and 104 respectively in a well known manner.

Transformers 58, 63, 70, 77, and 84 are for the speakers of plane P–1, which are all simultaneously controlled by calibrating volume control 91. Transformers 64, 46, 66, 48, and 68 are for the speakers of plane P–2 which are all simultaneously controlled by calibrating volume control 95. Transformers 72, 50, 74, 52, and 76 are for the speakers of plane P–3, which are all simultaneously controlled by calibrating volume control 94. Transformers 78, 54, 80, 56, and 82 are for the speakers of plane P–4, which are all simultaneously controlled by calibrating volume control 93. Transformers 86, 60, 88, 62, and 80 are for the speakers of plane P–5, which are all simultaneously controlled by calibrating volume control 92.

In order to calibrate each level of the auditorium such that each viewing observer hears as directionally realistic sound reproduction as possible, the following steps are taken:

First a suitable audio signal 114 is applied to the control grid of the first stage of amplifier system 104 through switch 106, to the control grid of the first stage of amplifier system 103 through switch 107, to the control grid of the first stage of amplifier system 102 through switch 108, and to the control grid of the first stage of amplifier system 101 through switch 109.

Second switches 110, 111, 112, 113, 109, and 108 are opened and switches 106 and 107 are closed. The instrument of FIGS. 9 and 12 is held with its +X axis toward P–6 and perpendicular to planes P–6, P–7, and P–8; with its +Y axis toward the ceiling and perpendicular to it; and with its +Z axis toward plane P–1 and perpendicular to it. It is held as above described in the center of segment 1 first and calibrating volume controls 47 and 67 (for the S3 and S4 speakers in P–2 and P–7) are adjusted until ammeter (or galvanometer) 130 reads zero. Now it is held like this in the center of segment 2 and calibrating volume controls 51 and 73 (for the S3 and S4 speakers in planes P–3 and P–7) are adjusted until ammeter 130 reads zero. Likewise 55 and 79 (for the S3 and S4 speakers in planes P–4 and P–7) are adjusted until ammeter 130 reads zero; 59 and 87 (for the S3 and S4 speakers in planes P–5 and P–7) are adjusted until ammeter 130 reads zero; 49 and 69 (for the S3 and S4 speakers in planes P–2 and P–8) are adjusted until ammeter 130 reads zero; 54 and 75 (for the S3 and S4 speakers in planes P–3 and P–8) are adjusted until ammeter 130 reads zero; 57 and 81 (for the S3 and S4 speakers in planes P–4 and P–8) are adjusted until ammeter 130 reads zero; and 61 and 89 (for the S3 and S4 speakers in planes P–5 and P–8) are adjusted until ammeter 130 reads zero. Now for each segment the Y components of sound are balanced (have a vectorial sum of zero) in a most desirable manner.

Third switch 108 is closed and the other switches are left as they were. The instrument of FIGS. 9 and 12 is again held in segment one as described in step 2 above and calibrating volume controls 236 and 237 are adjusted (in any well known manner) until the intensity (in microwatts per square centimeter) is some 15% greater for the speakers (S3 and S4) of P–8 (in segment 5) than it is for the speakers (S3 and S4) of P–7 (in segment 1). At this point calibrating volume control 65 is varied until ammeter 122 (of FIGS. 9 and 12) reads zero. Now the instrument of FIGS. 9 and 12 is held in the center of segment five as it was in segment 2 and calibrating volume control 237 is varied until ammeter 122 reads zero. Now the instrument of FIGS. 9 and 12 is moved back to the center of segment 1 as it was before and calibrating volume control 65 is varied until ammeter 122 reads zero. The instrument is moved back and forth from the center of segment 1 to the center of segment 5 and back and the calibrating volume controls 65 and 237 are varied until ammeter 122 reads zero for both segment 1 and segment 5. In the same way the instrument is moved back and forth between the centers of segments 2 and 6 and calibrating volume controls 71, 234, 235 are varied until the vector sum of the X components of sound equals zero as measured by ammeter 122, is moved back and forth between the centers of segments 3 and 7 and calibrating volume controls 83, 232, and 233 are varied until the vector sum of the X components of sound equals zero as measured by ammeter 122, is moved back and forth between the centers of segments 4 and 8 and calibrating volume controls 85, 230, and 231 are varied until the vector sum of the X components of sound equals zero as measured by ammeter 122. At this point the vector sum of both the X and Y components of sound for the center of each segment should equal zero.

It may now be seen that calibrating volume controls 47, 67, 49, 69, 51, 73, 53, 75, 55, 79, 57, 81, 59, 87, 61, and 89 are used to balance the Y components of sound and calibrating volume controls 65, 236, 237, 71, 234, 235, 83, 232, 233, 85, 230, and 231 are used to balance the X components of sound.

Fourth switch 109 is closed and the other switches are left as they were. In a well known manner calibrating volume controls 94 and 95 are varied such that speakers (S2, S3, and S4) of plane P–3 are adjusted as to have some 15% greater intensity (in microwatts per square centimeter) than speakers (S2, S3, and S4) of plane P–2; calibrating volume control 93 is varied such that speakers (S2, S3, and S4) of plane P–4 are adjusted as to have some 15% greater intensity than speakers (S2, S3, and S4) of plane P–3; and calibrating volume control 92 is varied such that speakers (S2, S3, and S4) of plane P–5 are adjusted as to have some 15% greater intensity than speakers (S2, S3, and S4) of plane P–4. Now the instrument of FIGS. 9 and 12 is placed in the center of either segment 1 or segment 5 as described in step 3 above and calibrating volume control 91 is varied until the intensity from speakers S1 is such as to cause ammeter 115 to read zero. At this point the instrument described above (of FIGS. 9 and 12) is placed in the center of either segment 2 or segment 6 as described in step 3 and calibrating volume control 94 is varied until the vector sum of the Z components of sound at the center of segments 2 and 6 is zero as indicated by ammeter 115 (of FIGS. 9 and 12). Next the instrument described is place in the center of either segment 3 or segment 7 as described above and calibrating volume control 93 is varied until the vector sum of the Z components of sound at the center of segments 3 and 7 is zero as indicated by ammeter 115 (of FIGS. 9 and 12). Next the instrument described above is placed in the center of either segment 4 or segment 8 as described above and calibrating volume control 92 is varied until the vector sum of the Z components of sound at the center of segments 4 and 8 is zero as indicated by ammeter 115 (of FIGS. 9 and 12). The instrument is again placed in either segment 1 or segment 5 and calibrating volume control 91 is again varied until the vector sum of the Z components of sound at the center of segments 1 and 5 is zero as indicated by ammeter 115. The instrument is again placed in either segment 2 or 6 and calibrating volume control 94 is again varied until the vector sum of the Z components of sound at the center of segments 2 and 6 is zero as indicated by ammeter 115.

Figure 9:
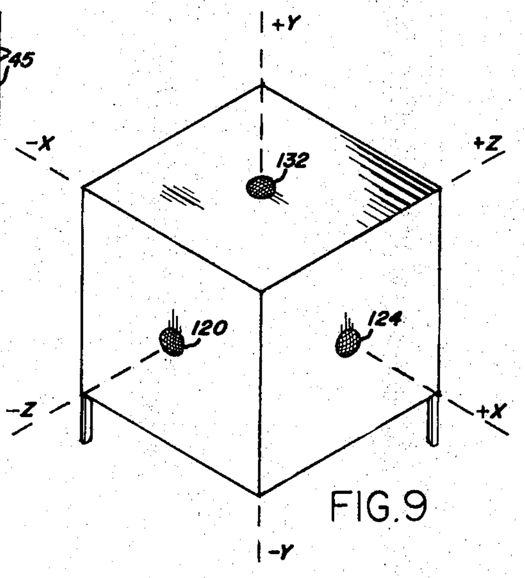
FIG. 9 is an elevational view of a device used to calibrate various reproduction systems involved in the invention.
Figures 12, 13, 13A:
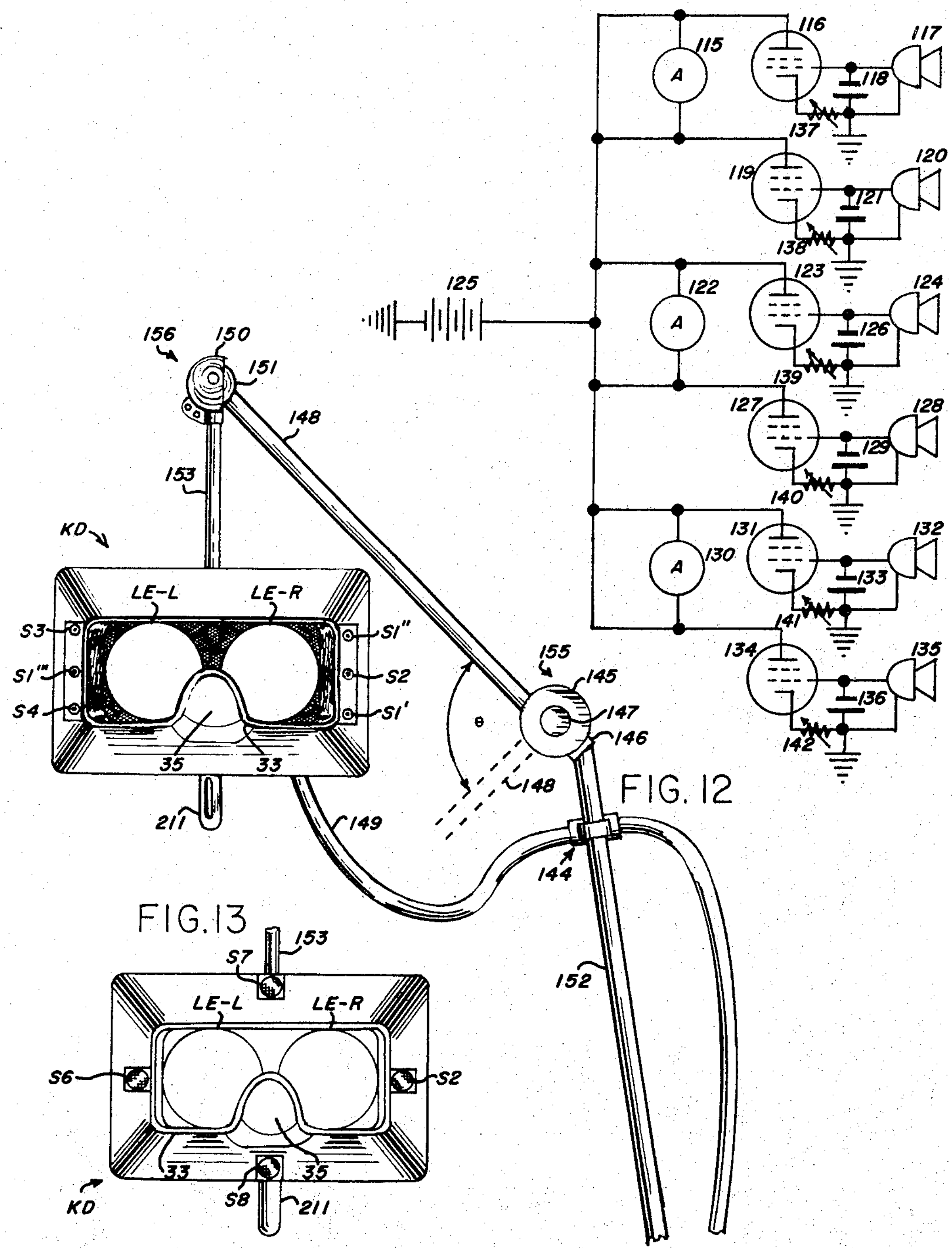
FIG. 12 is a schematic diagram of the electronic circuitry of the device of FIG. 9.
FIG. 13 is a front view of an individual KD set showing part of the apparatus for supporting it in such a manner as to allow relatively complete freedom of movement, and part of some stereophonic sound reproduction systems involved in the invention.

This procedure is gone through until the vector sum of the Z components of sound at the center of each segment is equal to zero as measured by the instrument of FIGS. 9 and 12.

Steps 1, 2, 3, and 4 of the above calibrating procedure are gone through until RS at the center of each segment is equal to zero as measured by the instrument of FIGS. 9 and 12 (ammeter 115, 122, and 130 read zero) when switches 106, 107, 108, and 109 are closed and switches 113, 112, 111, and 110 are opened.

Fifth switches 106, 107, 108, and 109 are opened; switches 110, 111, 112, and 113 are closed; signal generator 114 is turned off or taken out of the circuit; and the auditorium level (in point) is stereophonically ready to present wide angle stereoscopic stereophonic action scenes to a group of viewing observers.

It may be seen that only a minority group sitting in the auditorium of FIG. 10 will hear the stereophonic sound as it should be heard. For example a person sitting very close to and behind the intersection of planes P–4 and P–7 will hear the wrong sounds from the S3 speaker immediately in front of him, and the S4 speaker immediately in front of him. The only people who will have sound relatively ideally reproduced for them are the people sitting in the center of the first segment, the center of the second segment, the center of the third segment, the center of the fourth segment, the center of the fifth segment, the center of the sixth segment, the center of the seventh segment, and the center of the eighth segment. The quality of the stereophonic effect of the reproduced sound would decrease as the distance from these respective eight centers increases. In other words the stereophonic effect of the sound reproduced upon the ears of a viewing observer sitting in segment one the farthest away from the center of segment one will appear unrealistic. To sum it all up, the location of a viewing observer in the auditorium of FIG. 10 has a very definite effect on the realism of the stereophonic sound reproduced, and there is quite a difference between the most realistic location and the least realistic location.

A method of reproducing sound recorded on tracks T1, T2, T3, and T4, which for practical purposes reproduces exactly the same (+Z, −Z, +X, −X, +Y, and −Y) stereophonic effect upon every viewing observer in the auditorium and which has a very realistic reproduction of the (+Z, −Z, +X, −X, +Y, −Y) components of sound, will now be set forth.

Figure 16:
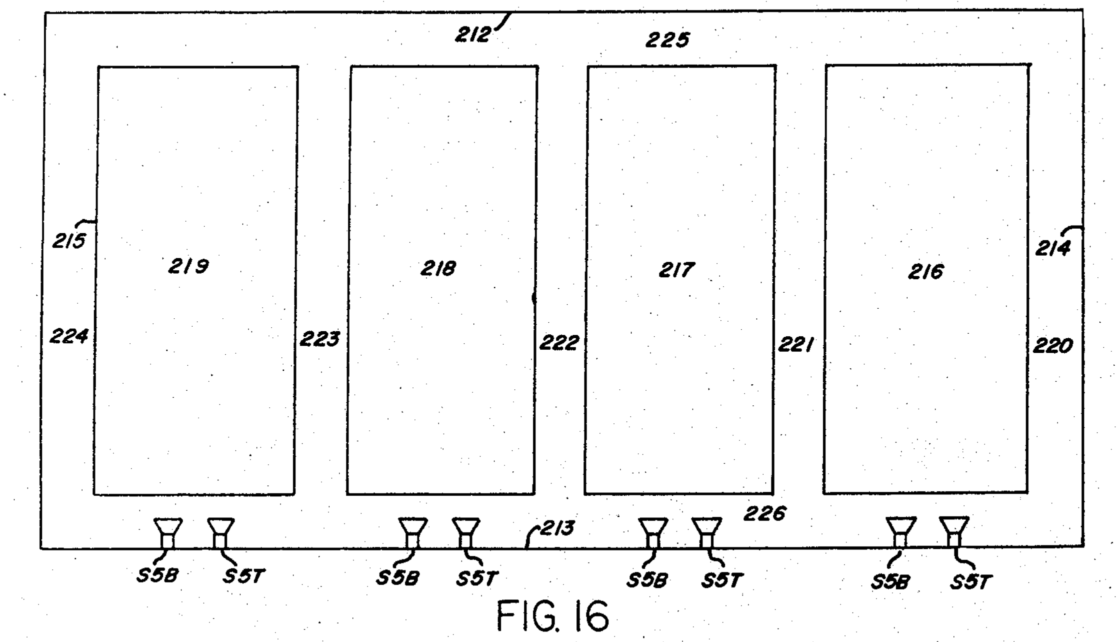
FIGS. 16 and 16(*a*) are diagrammatic views showing part of some of the stereophonic reproduction systems involved in the invention.
Figure 16A:
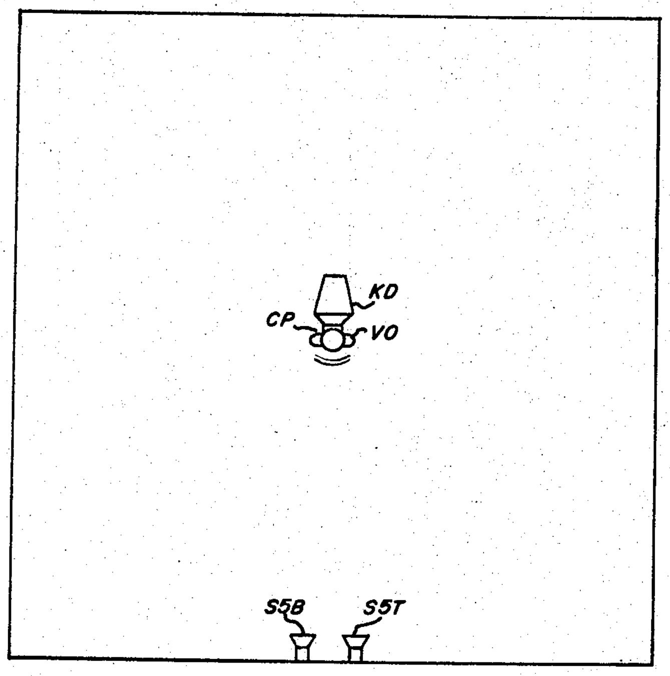

Reference is now made to FIG. 16. In the contemplated form of this method each floor (or level) of the auditorium will be some 50 feet long (from front to back) and some 100 feet wide (from left to right), and some 8 feet high. It will be divided into four seating areas 216, 217, 218, and 219 which are approximately 17.8 feet wide and 40 feet long each. It will have seven aisles 220, 221, 222, 223, 224, 225, and 226 which are each approximately 5 feet wide. Aisles 220 is adjacent right wall 214 and is some 50 feet long. Aisles 224 is adjacent left wall 215 and is some 50 feet long. Aisles 225 is adjacent front wall 212 and is some 100 feet long. Aisle 226 is adjacent rear wall 213 and is some 100 feet long. Aisles 221, 222, and 223 are some 50 feet long. Speakers S5B and S5T are placed on rear wall 213 about half way between the floor and the ceiling of each said level. Speakers S5B are "woofer" speakers and speakers S5T are the "tweeter" speakers. Speakers S5 have their dual arrangement (S5B and S5T) in order to have a substantially uniform response throughout the entire audio range from 30 to 15,000 c.p.s. in a manner well known in the art.

Figures 14, 14A:
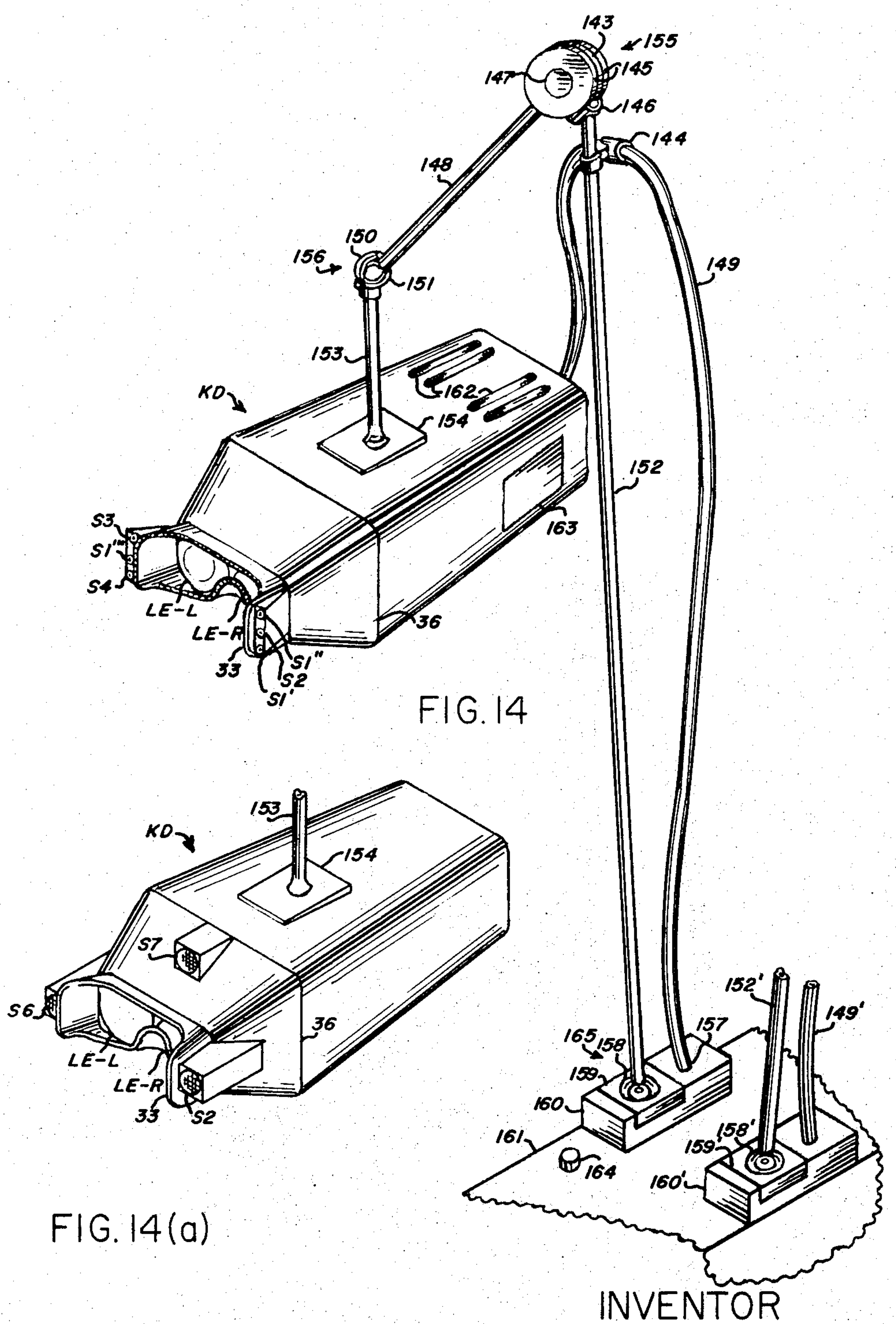
FIG. 14 is an elevational view showing the KD set of FIG. 13, all of the apparatus for supporting it in such a manner as to allow relatively complete freedom of movement, and part of some stereophonic sound reproduction systems involved in the invention.

Reference is now made to FIGS. 13 and 14. FIGS. 13 and 14 show a form which the picture portion of kinescopic optical viewing Device KD described in my copending application 275,411, filed April 24, 1963, may take. Also the picture portion of the cathode ray tube optical viewing device CV of my prior application 250,562, filed Jan. 10, 1963, may take the form of FIGS. 13 and 14 of the present invention.

Face guiding eye shield 33 is constructed such that when the viewing observer VO (of FIG. 1) has (by use of handle 211 of FIG. 13) positioned KD such that his left eye is viewing correctly into LE–L and his right eye is viewing correctly into LE–R, speakers S2 and S1‴ will be approximately one inch from the center of his right and left ears respectively. Speakers S1′, S1″, S‴, S2, S3 and S4 have corresponding points which lie in a plane which is perpendicular to the axle of view (+Z) of any viewing observer (VO of FIG. 1). Speaker S1″ is 1.5 inches above S2 and speaker S1′ is 1.5 inches below S2. Speaker S3 is 1.5 inches above S1‴ and speaker S4 is 1.5 inches below S1‴.

If the distance between the right ear of a first viewing observer and the left ear of a second viewing observer (sitting to the right of said first viewing observer) is 18 inches, application of elementary physics would show that the intensity (in microwatts per square centimeter) reaching the right ear of said first viewing observer from the speaker S2 (which is 1″ from his right ear) would be some 324 times as great as the intensity reaching said right ear of said first viewing observer from speaker S1‴ (which is 1″ from the left ear of said second viewing observer) if equal intensities leave said speakers S2 and S1‴.

It is therefore considered that the sound intensity caused by the speakers of KD sets adjacent the KD set of the viewing observer in point has only a negligible directional effect.

It is here pointed out that although the speakers of FIGS. 13 and 14 are too small to be constructed to closely reproduce the complete audio spectrum, they may reproduce a large enough portion of the audio spectrum to closely give the sensation of the proper directional components of sound (+Z, −Z, +X, −X, +Y, and −Y) to the ears of a viewing observer, when used in conjunction with S5B and S5T. The fidelity and range of audio spectrum required for realism will be reproduced by speakers S5B and S5T described above.

Figure 15:
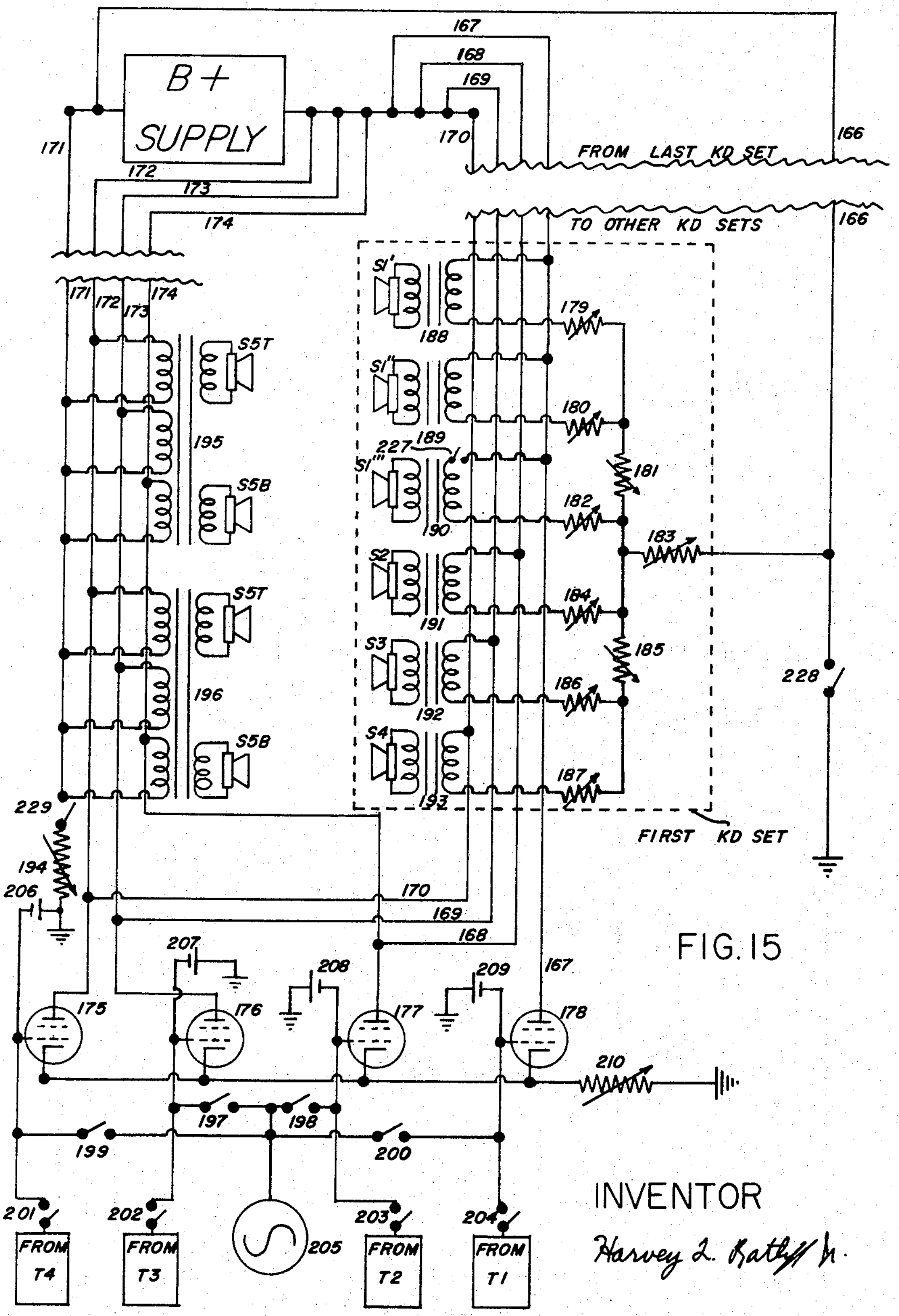
FIG. 15 is a schematic diagram of a complete stereophonic reproduction system involved in the invention.

Reference is now made to FIG. 15 which schematically illustrates the electronic circuitry of the stereophonic sound system of FIGS. 13, 14, 15, and 16 presently being described. The audio signal from track T1 is applied through switch 204 to the grid of the first stage of an amplifier system 278 which has many stages (each having a steady D.C. biasing voltage such as 209). The amplified signal from the output of amplifier 178 is applied to the input coil of each of transformers 188, 189, and 190 of speakers S1′, S1″, and S1‴ of each KD set (shown in FIGS. 13 and 14) in each level (shown in FIG. 16) of the auditorium. The B+ supply voltage is grounded on its negative end through switch 228 on bus line 166 and applied in a proper well known manner at its positive end through bus line 167 to the plate of each tube in each stage of amplifier 178. The input coil of each speaker S1′ is connected at one end to grounded bus line 166 through each volume control 179, each volume control 181, and each general volume control 183, of each KD set and at the other end to the plate of the final stage of amplifier system 178. The cathode of each tube of amplifier 178 is connected to ground through general volume control 210.

The input coil of each speaker S1″ is connected at its negative end to grounded bus line 166 through each volume control 180, each volume control 181, and each general volume control 183 of each KD set, and at its positive end to the plate of the final stage of amplifier system 178. The input coil of each speaker S1‴ is connected at its negative end through each switch 227 to grounded bus line 166 through each volume control 182 and each general volume control 183 of each KD set, and at its positive end to the plate of the final stage of amplifier system 178.

The audio signal from track T2 is applied through switch 203 to the grid of the first stage of an amplifier system 177 which has many stages (each having a steady D.C. biasing voltage such as 208). The amplified signal from the output of amplifier 177 is applied to the input coil of each of transformers 191 of each KD set (shown in FIGS. 13 and 14) in each level (shown in FIG. 16) of the auditorium. The amplified signal from the output of amplifier 177 is also applied to one of the input coils for each of the transformers (such as 195 and 196) of each set of speakers S5B and S5T (shown in FIG. 16). As shown in FIG. 15 there are three input coils for each of the transformers such as 195 and 196. One coil is from track 2; one coil is from track 3; and one coil is from track 4. There could however, be two input coils from each sound track (a "woofer" coil and a "tweeter" coil) in each of the transformers such as 195 and 196. This of course would make six input coils per transformer. The B+ supply is also connected on its negative end to bus line 171 (as shown in FIG. 15) which is grounded through switch 229 and general volume control 194, and applied at its positive end through bus lines 168 and 174 to the plate of each tube in each stage of amplifier system 177 in a proper well known manner. The input coil of each speaker S2 of each KD set is connected at its negative end to grounded bus line 166 through each volume control 184 and each general volume control 183 of each KD set, and at its positive end to the plate of the final stage of amplifier system 177. The T2 input coil of each speaker system (S5B and S5T) is connected at its negative end to bus line 171 which is grounded through switch 229 and general volume control 194, and at its positive end to the plate of the final stage of amplifier system 177 in a well known manner.

The B+ supply is also properly applied at its positive end through bus lines 169 and 173 to the plate of each tube in each stage of amplifier system 176 in a well known manner. The input coil of each speaker S3 of each KD set is connected at its negative end to switchably grounded bus line 166 through each volume control 186, each volume control 185, and each general volume control 183 of each KD set, and at its positive end to the plate of the final stage of amplifier system 176 in a well known manner. The T3 input coil of each speaker system (S5B and S5T) is connected at its negative end to bus line 171 which is grounded through switch 229 and general volume control 194, and at its positive end to the plate of the final stage of amplifier system 176.

The B+ supply is also properly applied at its positive end through bus lines 170 and 172 to the plate of each tube in each stage of amplifier system 175 in a well known manner. The input coil of each speaker S4 of each KD set is connected at its negative end to switchably grounded bus lines 166 through each volume control 187, each volume control 185, and each general volume control 183 of each KD set, and at its positive end to the plate of the final stage of amplifier system 175 in a well known manner. The T4 input coil of each speaker system (S5B and S5T) is connected at its negative end to bus line 171 which is grounded through switch 229 and general volume control 194, and at its positive end to the plate of the final stage of amplifier system 175 in a well known manner.

In order to calibrate each KD set such that each viewing observer viewing into each KD set on each level of the auditorium will hear the most ideal stereophonic reproduction of the six components of sound (+Z, −Z, +X, −X, +Y, and −Y), the following procedure is carried out:

First a suitable audio signal source 205 is connected through switch 199 to the grid of the first stage of amplifier system 175, is connected through switch 197 to the grid of the first stage of amplifier system 176, is connected through switch 198 to the grid of the first stage of amplifier system 177, and is connected through switch 200 to the grid of the first stage of amplifier system 178. Second switches 201, 202, 203, 204, 200, and 228 are opened. Third switches 197, 198, 199, 229 are closed. Fourth the audio output of signal source 205 is regulated such that the sound intensity (caused by speakers S5B and S5T) half way between walls 212 and 213 (of FIG. 16) of a given level or floor of the auditorium is 0.5 microwatt per square centimeter. From elementary physics it may be seen that if $10^{-6}$ microwatts per square centimeter is taken as the zero decibel level, 0.5 mw./cm.$^2$ has a level of some 57 db. Also elementary physics shows that under these conditions the intensity caused by speakers S5B and S5T five feet in front of wall 213 is 12.5 microwatts per square centimeter (71 decibels) and the intensity caused by speakers S5B and S5T five feet to the rear of wall 212 is 0.0556 microwatt per square centimeter (48 decibels). In other words the intensity level is some 23 decibels higher in the rear seats than it is in the front seats. Assuming the above db datum ($10^{-6}$), it is considered not to be too unrealistic for ordinary conversation to have a level of 48 db–71 db (but this could be varied quite a bit without changing the scope of the invention, of course).

The fifth step is to open switches 229, 201, 202, 203, 204, 199, 197, 198, and 227 and close switches 200 and 228, thereby placing the signal generated by 205 only through speakers S1′ and S1″ (shown in FIGS. 13, 14, and 15). The sixth step is to place the calibrating instrument of FIGS. 9 and 12 such that the +Z, −Z, +X, −X, +Y, and −Y axis of the instrument of FIG. 9 will be substantially identical to those of VO (of FIG. 1) while he or she is viewing properly into KD (of FIGS. 13 and 14). The seventh step is to vary volume controls 179 and 180 until ammeter or galvanometer 130 reads zero. This is done to each KD set in the auditorium, however, every set is completely calibrated before calibration is started on the following set. At this point it may be seen that the +Y component of sound emitted from S1″ is equal the −Y component of sound emitted S1′ because of the calibration step seven. The eighth step is to close switch 227 and to leave all other switches as they were. The ninth step is to vary volume controls 181 and 182 until ammeter (or galvanometer) 122 reads zero. This step is of course also applied to each KD set in its respective turn. Now both ammeter 130 and 122 read zero if the instrument of FIGS. 9 and 12 is properly located. It may now be seen that the +X component of sound emitted from S1′ and S1″ working together is equal the −X component of sound emitted from S1‴ alone because of calibration step 9. Therefore when speakers S1′, S1″, and S1‴ receive sound from a single signal source (as they do either when switch 200 is closed and switch 204 is opened or when switch 200 is opened and switch 204 is closed) they will reproduce no resultant X components of sound and no resultant Y components of sound for a viewing observer viewing properly into each KD set, which is what they are supposed to do. The tenth step is to close switches 199 and 197, to open switch 200, and to leave all other switches as they were. The eleventh step is to vary volume controls 186 and 187 until ammeter 130 reads zero. At this point it may be seen that when the +Y components of sound is supposed to equal the −Y component of sound speakers S3 and S4 will reproduce them equally because of calibration step eleven. Steps ten and eleven are of course also applied to each KD set in its respective turn. The twelfth step is to close switch 198 and to leave all other switches as they were. The thirteenth step is to vary volume controls 184 and 185 until ammeter 122 reads zero. Steps twelve and thirteen are also applied to each KD set in its respective turn. At this point it may be seen that when the resultant of the X components of sound is supposed to equal zero it will because of calibration step 13. If at this point the instrument of FIGS. 9 and 12 is positioned correctly ammeter 130 and 122 should both read zero when switches 197, 198, 199, 200, 227, and 228 are closed and all other switches are opened. The fourteenth step is to close switches 197, 198, 200, 227, and 229 and to open switches 201, 202, 203, and 204. The fifteenth step is to vary volume controls 183 until ammeter 115 reads zero. At this point it may be seen that when the resultant of the Z components of sound is supposed to equal zero it will because of calibration step 15. Also at this point if the instrument of FIGS. 9 and 12 is positioned correctly ammeters (or galvanometers) 115, 122, and 130 will each read zero.

The above described calibration steps 1–4 are performed only one time for each level (or floor) of the auditorium, but the above described calibration steps 5–15 are performed upon each KD set of each level (or floor) of the auditorium.

After the above described calibration steps 1–15 are completed for each KD set of each level, only the general volume control 210 is used to change the intensity of the auditorium.

At this point switches 197, 198, 199, 228 and 200 are opened and all other switches are closed, and the auditorium is calibrated to reproduce the +Z, −Z, +X, −X, +Y, and −Y components of sound very realistically for every viewing observer viewing correctly (with his nose in nose guide 35) into a KD set.

Of course if volume control 210 is left unchanged each viewing observer would hear a sound intensity twice as great (0.111–25) in microwatts per square centimeter as each in the same location would after the above described step 4 was performed; therefore, the decibel range would be some (50 db–74 db) in each level of the auditorium for the reproduction of normal conversation after the above described calibration procedure is performed. Of course this db level may be altered by general volume control 210 without losing very realistic stereophonic effect desired.

As pointed out in the description of the recording process, when the +Y component of sound is greater than the −Y component of sound (in other words there is a resultant +Y component of sound), the intensity recorded on T3 is greater than the intensity recorded on T4. Because of the above described calibration steps 1–15, when the intensity recorded on T3 equals the intensity recorded on T4, the intensity emitted by S3 equals the intensity emitted by S4. Therefore, when the intensity recorded on T3 is greater than the intensity recorded on T4 every properly calibrated KD set reproduces a resultant +Y component of sound for its corresponding viewing observer. Obviously, when the intensity recorded on T4 is greater than the intensity recorded on T3, every properly calibrated KD set reproduces a resultant −Y component of sound.

Obviously if there was no resultant +Z, −Z, +X, −X, +Y, or −Y component of sound (in other words $RS=0$) in the original scene (at a specific instant of time), the intensity recorded upon T1, T2, T3, and T4 is equal. Regardless of the magnitude of the intensity, the intensity recorded when $RS=0$ will be defined as ($I1_0$ upon T1), ($I2_0$ upon T2), ($I3_0$ upon T3), and ($I4_0$ upon T4). Any intensity recorded upon tracks T1, T2, T3, and T4 is here defined as I1, I2, I3, and I4 respectively. It is here pointed out that because of the above described calibration steps 1–15, when the intensity recorded upon each track T1, T2, T3, and T4 is equal ($I1_0$, $I2_0$, $I3_0$, and $I4_0$) the RS reproduced by every properly calibrated KD set for its corresponding (correctly viewing) viewing observer is zero as it should be.

When there is a resultant +Y component recorded such that:

$$I3>I3_0 \text{ and } I4<I4_0$$

These conditions will be reproduced by every properly calibrated KD set (although the magnitude of the resultant will not be the same in all probability).

When there is a resultant −Y component recorded such that:

$$I3<I3_0 \text{ and } I4>I4_0$$

These conditions will be reproduced by every properly calibrated KD set (although the magnitude of the resultant will not be the same in all probability).

When there is a resultant +X component recorded such that:

$$I2>I2_0 \text{ and } I3+I4<I3_0+I4_0$$

These conditions will be reproduced by every properly calibrated KD set (although the magnitude of the resultant will not be the same in all probability).

When there is a resultant −X component recorded such that:

$$I2<I2_0 \text{ and } I3+I4>I3_0+I4_0$$

These conditions will be reproduced by every properly calibrated KD set (although the magnitude of the resultant will not be the same in all probability).

When there is a resultant +Z component recorded such that:

$$I1>I1_0 \text{ and } I2+I3+I4<I2_0+I3_0+I4_0$$

These conditions will be reproduced by every properly calibrated KD set working in conjunction with S5B and S5T (although the magnitude of the resultant will not be the same in all probability).

When there is a resultant −Z component recorded such that:

$$I1<I1_0 \text{ and } I2+I3+I4>I2_0+I3_0+I4_0$$

These conditions will be reproduced by every properly calibrated KD set working in conjunction with S5B and S5T (although the magnitude of the resultant will not be the same in all probability).

It may now be seen that the latter described stereophonic reproduction system will substantially reproduce any recorded resultant direction component of sound (RS) for every viewing observer in the auditorium from only four sound tracks T1, T2, T3, and T4, and the RS reproduced will virtually be the same for every viewing observer in the auditorium. Of course the reproduced RS will not be in the exact direction of the original recorded RS, but it will be in the general direction of the original recorded RS. In other words if the original RS is to the left, above and in front of MR (of FIGS. 4 and 5), the reproduced RS is to the left, above and in front of the viewing observer, viewing correctly into a KD set; if the original RS is to the right, below, and behind MR, the reproduced RS is to the right, below, and behind the viewing observer viewing correctly in a KD set; etc.

A modified form of the KD speaker arrangement is illustrated in FIGS. 13(*a*), 14(*a*), and 17. In this arrangement speakers S7 and S8 are in front of the most forward portion of the viewing observer's head and are some four inches apart (S7 is four inches vertically above S8). This arrangement makes possible a more realistic reproduction of the +Z component of sound and also a more realistic reproduction of the +Y and −Y components of sound, while keeping speakers S2 and S6 within an inch of the viewing observer's ears which causes the advantages described above.

The KD sets of FIGS. 13(*a*) and 14(*a*) may be used in a level of an auditorium illustrated in FIG. 16 which is described above. The KD sets shown in FIGS. 13(*a*) and 14(*a*) are the same as that shown in FIGS. 13 and 14 described above in every respect except the speaker arrangement.

Figure 17:
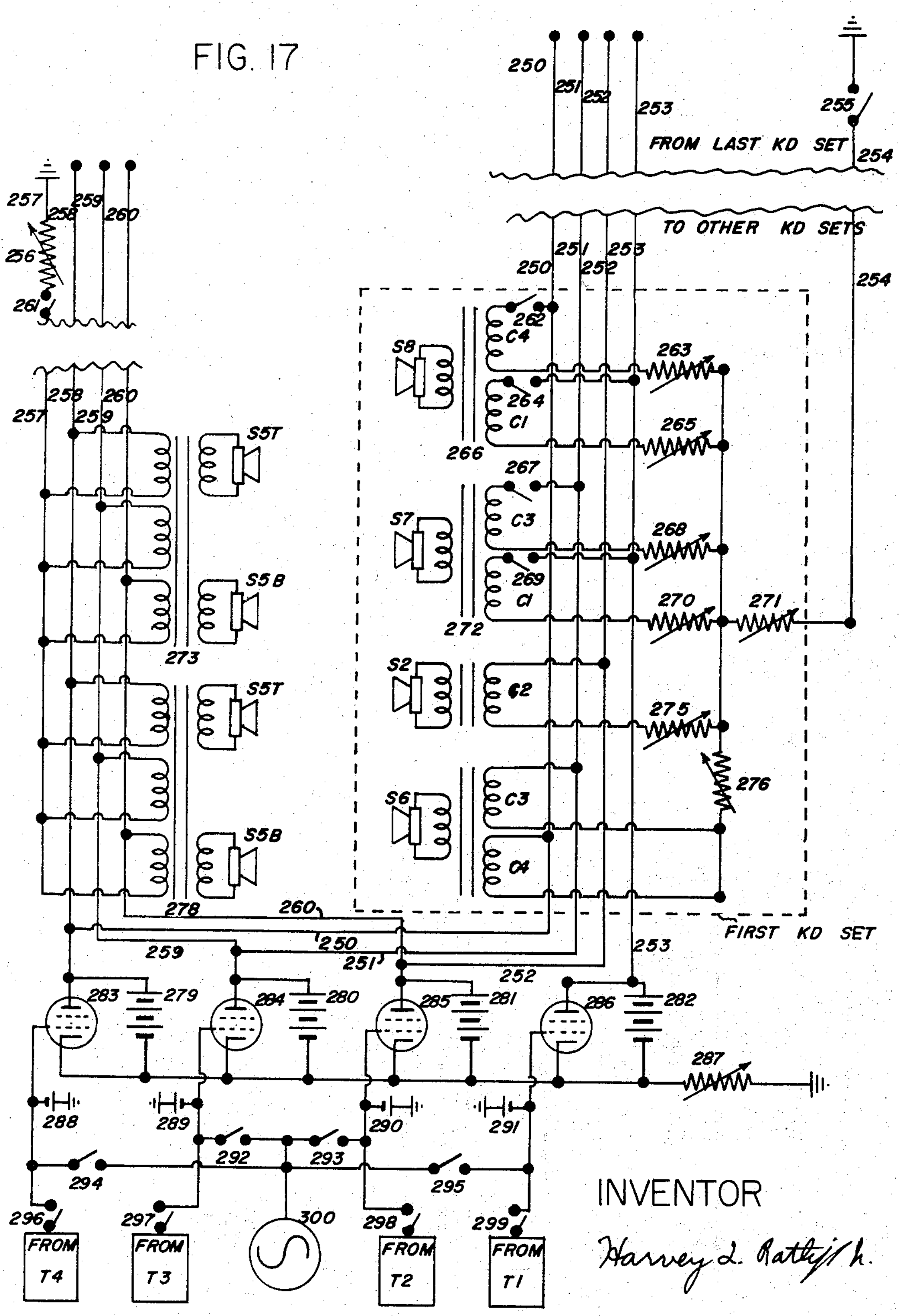
FIG. 17 is a schematic diagram of a complete stereophonic reproduction system involved in the invention.

Reference is now made to FIG. 17 which schematically illustrates the electronic circuitry of the stereophonic sound system of FIGS. 13(*a*), 14(*a*), 16, and 17 presently being described. The audio signal from track T1 is applied through switch 299 to the grid of the first stage of an amplifier system 286 which has many stages (each having a steady D.C. biasing voltage such as 291). The amplified signal from the output of amplifier system 286 is applied through switch 264 to each input coil C1 of each transformer 266 of each speaker S8 of each KD set of each level of the auditorium by way of bus line 253 and is applied through bus line 253 and switch 269 to each input coil C1 of each transformer 272 of each speaker S7 of each KD set of each level of the auditorium. The B+ supply voltage 282 is connected on its negative end in a proper well known manner to the cathode of each stage of amplifier system 286 and also grounded as shown through general volume control 287 and applied in a proper well known manner at its positive end to the plate of each tube in each stage of amplifier system 286. The input coil C1 of each speaker S8 of each KD set is connected at one end to switchably grounded bus line 254 through each volume control 265 and through each volume control 271 of each KD set, and at the other end to the plate of the final stage of amplifier system 286. The input coil C1 of each speaker S7 of each KD set is connected at one end to switchably grounded bus line 254 through each volume control 270 and through each volume control 271 of each KD set, and at the other end to the plate of the final stage of amplifier system 286.

The audio signal from track T2 is applied through switch 298 to the grid of the first stage of amplifier system 285 which has many stages (each having a steady D.C. biasing voltage such as 290). The amplified signal from the output of amplifier 285 is applied through bus line 252 to each input coil C2 of each transformer 274 of each KD set (shown in FIGS. 13(*a*) and 14(*a*)) in each level (shown in FIG. 16) of the auditorium. The amplified signal from the output of amplifier system 285 is also applied through bus line 260 to one end of one of the input coils for each of the transformers (such as 273 and 278) of each set of speakers S5B and S5T (shown in FIG. 16 and described in the description of FIG. 16 above). The other end of each of these coils is grounded through switch 261 and volume control 256. The B+ supply 281 is connected properly in a well known manner on its negative end to the cathode of each stage of amplifier system 285 and is also grounded through general volume control 287. It is properly applied in a well known manner at its positive end to the plate of each stage of amplifier system 285. Coil C2 is also connected at its negative end through volume controls 275 and 271 to bus line 254 which is grounded through switch 255.

The audio signal from track T3 is applied through switch 297 to the control grid of the first stage of amplifier system 284 which has many stages (each having a steady D.C. biasing voltage such as 289). The amplified signal from the output of amplifier 284 is applied through bus line 251 to the positive end of each input coil C3 of each transformer 272 and 277 of each KD set (shown in FIGS. 13(*a*) and 14(*a*) in each level (shown in FIG. 16) of the auditorium. The amplified signal from the output of amplifier system 284 is also applied through bus line 259 to one end of another of the input coils for each of the transformers (such as 273 and 278) of each set of speakers S5B and S5T (shown in FIG. 16 and described above). The other end of each of these coils is connected through switch 261 and general volume control 256 to ground. The B+ supply 280 is connected properly in a well known manner on its negative end to the cathode of each stage of amplifier system 284 and is also grounded through general volume control 287. It is properly applied in a well known manner at its positive end to the plate of each stage of amplifier system 284. Coil C3 of speaker S7 is also connected at its negative end through volume controls 268 and 271 to bus line 254 which is grounded through switch 255. Coil C3 of speaker S6 is also connected at its negative end through volume controls 276 and 271 to bus line 254 which is grounded through switch 255.

The audio signal from track T4 is applied through switch 296 to the control grid of the first stage of amplifier system 283 which has many stages (each having a steady D.C. biasing voltage such as 288). The amplified signal from the output of amplifier system 283 is applied through bus line 250 to the positive end of each input coil C4 of each transformer 266 and 277 of each KD set (shown in FIGS. 13(*a*) and 14(*a*)) in each level (shown in FIG. 16) of the auditorium. The amplified signal from the output of amplifier system 283 is also applied through bus line 258 to the positive end of still another of the input coils for each of the transformers (such as 273 and 278) of each set of speakers S5B and S5T (shown in FIG. 16 and described above). The negative and of each of these coils is connected through switch 261 and general volume control 256 to ground. The B+ supply 279 is connected in a proper well known manner on its negative end to the cathode of each stage of amplifier system 283 and is also grounded through general volume control 287. It is properly applied in a well known manner at its positive end to the plate of each stage of amplifier system 283. Coil C4 of speaker S8 is also connected at its negative and through volume controls 263 and 271 to bus line 254 which is grounded through switch 255. Coil C4 of speaker S6 is also connected at its negative end through volume controls 276 and 271 to bus line 254 which is grounded through switch 255.

In order to calibrate each KD set such that each viewing observer viewing into each KD set on each level of the auditorium will hear the most ideal stereophonic reproduction of the six components of sound (+Z, −Z, +X, −X, +Y, and −Y), the following procedure is carried out:

First a suitable audio signal source 300 is connected through switch 295 to the control grid of the first stage of amplifier system 286, is connected through switch 293 to the control grid of the first stage of amplifier system 285, is connected through switch 292 to the control grid of the first stage of amplifier system 284, and is connected through switch 294 to the control grid of the first stage of amplifier system 283. Second switches 296, 297, 298, 299, 255, and 295 are opened, and switches 292, 293, 294, and 261 are closed. Third the audio output of signal source 300 is regulated such that the sound intensity (caused by speaker S5B and S5T) half way between walls 212 and 213 (of FIG. 16) of a given level (or floor) of the auditorium of 0.5 microwatt per square centimeter as described in step 4 of the calibrating procedure of the KD sets of FIGS. 13 and 14 described above. Fourth close switches 295, 264, 269, and 255 and open all other switches. The fifth step is to place the calibrating instrument of FIGS. 9 and 12 as described in step 6 of the calibrating procedure of the KD sets of FIGS. 13 and 14 and described above. The sixth step is to vary volume controls 265 and 270 until ammeter or galvanometer 130 reads zero (indicating that the vector sum of the Y components of sound equals zero). This is done to each KD set in the auditorium, however, every set is completely calibrated before calibration is started on the following set. The seventh step is to close switches 292, 294, 262, 267, and 255 and to open all other switches. The eighth step is to place the calibrating instrument of FIGS. 9 and 12 as it was placed in step 5 of the present procedure. The ninth step is to vary volume controls 263 and 268 until ammeter 130 reads zero (indicating that the vector sum of the Y components of sound equals zero). This step is of course also applied to each respective KD set in its respective turn. The tenth step is to close switches 292, 293, 194, and 255 and to open all other switches. The eleventh step is to place the calibrating instrument of FIGS. 9 and 12 as it was placed in step 5 of the present procedure. The twelfth step is to vary volume controls 275 and 276 until ammeter or galvanometer 122 reads zero (indicating that the vector sum of the X components of sound equals zero). This step is of course also applied to each respective KD set in its respective turn. The thirteenth step is to close switches 262, 264, 267, and 269 of each KD set, to open switches 296, 297, 298, and 299, and to close all other switches. The fourteenth step is to place the calibrating instrument of FIGS. 9 and 12 as it was placed in step 5 of the present procedure. The fifteenth step is to vary volume controls 256 and 271 until ammeter or galvanometer 115 reads zero (indicating that the vector sum of the Z components of sound equals zero). At this point ammeters 115, 122, and 130 should all equal zero and therefore RS should equal zero. Therefore, the KD set in point in properly calibrated to reproduce a very realistic sounding RS for a viewing observer viewing properly in the KD set.

The above described calibration steps 1–3 are performed only one time for each level (of floor) of the auditorium, but the above described calibration steps 4–15 are performed upon each KD set of each level (or floor) of the auditorium.

After the latter above described calibration steps 1–15 are completed for each KD set of each level, only the general volume control 287 is used to change the sound intensity of the auditorium.

At this point switches 292, 293, 294, and 295 are opened and all other switches are closed and as described before the auditorium is calibrated to reproduce the +Z, −Z, +X, −X, +Y and −Y components of sound very realistically for every viewing observer viewing correctly into a KD set.

At this point the supporting apparatus and the wiring of the KD sets of FIGS. 13, 13(*a*), 14, and 14(*a*) will be explained in further detail. Rod 153 is rigidly secured to the KD set such that its axis passes approximately through the center of gravity of the KD set. Rod 153 is rigidly secured to socket 150 of ball and socket joint 156. Ball 151 is held within socket 150 such that it has universal freedom of rotation (may rotate in any direction within a conic angle of some 120°). The friction between ball 151 and socket 150 is great enough that the force of gravity alone (acting on the KD set and its associated parts) will not cause any movement. Ball 151 is rigidly secured to rod 148. Rod 148 is rigidly secured to cylindrical element 143 of elbow joint 155 which rotates about pin 147. Pin 147 is supported by cylindrical elements 145 which are rigidly secured to element 146. Elbow joint 155 is constructed such that the friction within is sufficient to stop all motion due to gravity alone. Element 146 is rigidly to rod 152 which is rigidly secured to ball 158 of ball and socket joint 165 (see FIG. 14). Socket 159 supports ball 158 such that it is free to rotate within a conic angle of some 120°. Joint 165 is also constructed such that the friction within is sufficient to stop all motion due to gravity alone. Socket 159 is supported by base 160 (which may be attached to the arm of an ordinary chair in an ordinary theater). It is, however, contemplated that the base of two adjacent KD sets 160 and 160′ will be attached to a single cabinet 161 such that they will be out of the way of either viewing observer. Because of this arrangement a couple of people can sit side by side with nothing between them while they are slightly separated from the adjacent couple. The wires carrying the various electrical signals are brought into the rear of the KD set within highly insulating means 149 which is brought up from the floor through a protecting means such as a cabinet 161 through hole 157 of base 160, through support 144 and into said rear of said KD set. It is contemplated that all electronic controls except on off switch 164 will be left for an expert to adjust. These controls will be within calibrating panels such as 163.

It may now be seen that a viewing observer VO may (by use of handle 211) move the KD set (of FIGS. 13 and 14 or 13(*a*) and 14(*a*)) to virtually any position he desires. He may move it up, down, to his right, to his right, to his left, backward, and forward. He may rotate it clockwise or counterclockwise in a multiplicity of horizontal planes and a multiplicity of vertical planes.

It is here pointed out, that if the conic angle allowed by joint 156 is 120° and if joint 155 will allow such an angle of rotation, the maximum height adjustment angle $\theta$ would be 120°. Under these conditions if rod 148 is one foot long, the sitting height adjustment distance would be 1.732 feet. This should allow for at least 3.464 feet difference in standing height (for example between 2 feet 10 inches and 6 feet 2.58 inches).

In wide angle stereoscopic, stereophonic motion pictures it is, at times, desirable to give the "environmental" or "background" music direction. Also, at times, well known "directional microphones" or the type of microphone system taught by W. A. Mueller in Patent No. 2,685,224 may be required. When these types of microphones are used, it is convenient to record all sound on one sound track (or record) T–5 and give it direction later in a manner which will presently be described. Further it is desirable to give direction to the sounds reproduced in animated cartoons.

When any of the reasons mentioned just above make it desirable to give sound from a single sound track or record here labeled T–5 virtually any and/or every directional component of sound the following apparatus and procedure will be used as part of the present invention:

Reference is now made to FIGS. 16(*a*), 18 19 and 20. The "sound director" or "sound expert" labeled VO in FIG. 16(*a*) sits in the control room of FIG. 16(*a*). Immediatley in front of the "sound director" VO is a KD set such as that shown in either FIGS. 13 and 14 or FIGS. 13(*a*) and 14(*a*), and a control knob 335 such as that shown in FIG. 20 within control panel CP partially shown in FIGS. 19 and 20. A "woofer" speaker S5B and a "tweeter" speaker S5T are directly to his rear as shown in FIG. 16(*a*). He (VO) is located substantially in the center of the room of FIG. 16(*a*) and he views into KD as an ordinary viewing observer ((VO) described above). The KD set is properly calibrated as described above.

Figure 18:
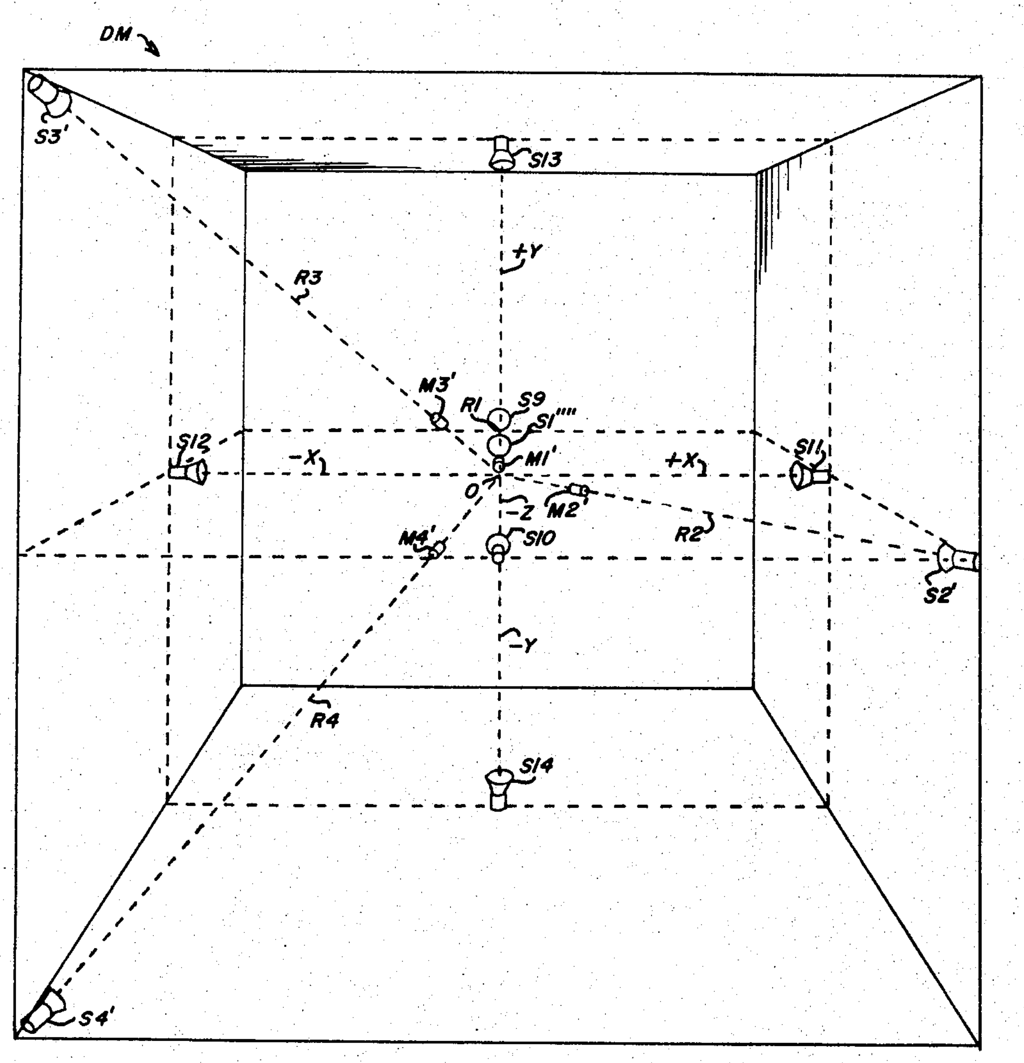
FIG. 18 is a perspective view of the "directional mixing room" DM showing the spatial relationship of the various speakers and microphones.

In another cubical directional mixing room DM of FIG. 18 are placed 10 speakers S'''', S2', S3', S4', S9, S10, S11, S12, S13, and S14, and four microphones M1', M2', M3', and M4'. Using the definitions of FIGS. 1 and 3; speaker S1'''' is substantially on the R1 axis facing the origin 0 (zero) and on the front wall of mixing room DM; speaker S2' is on the R2 axis facing the origin 0 and in the edge of the right and rear walls; speakers S3' is on the R3 axis facing the origin 0 and in the corner of the left, top, and rear walls; speaker S4' is on the R4 axis facing the origin 0 and in the corner of the left, bottom and rear walls; speaker S9 is on the +Z axis (or the R1 axis) facing the origin 0 and on the front wall; speaker S10 is on the −Z axis facing the origin 0 and on the rear wall; speaker S11 is on the +X axis facing the origin 0 and on the right wall; speaker S12 is on the −X axis facing the origin 0 and on the left wall; speaker S13 is on the +Y axis facing the origin 0 and on the ceiling; and speaker S14 is on the −Y axis facing the origin 0 and on the floor. Also by the definitions of FIGS. 1 and 3, microphone M1' is on the R1 axis facing away from the origin 0 some ten inches therefrom; microphone M2' is on the R2 axis facing away from the origin 0 some ten inches therefrom; microphone M3' is on the R3 axis facing away from the origin 0 some ten inches therefrom; and microphone M4' is on the R4 axis facing away from the origin 0 some ten inches therefrom.

Figure 19:
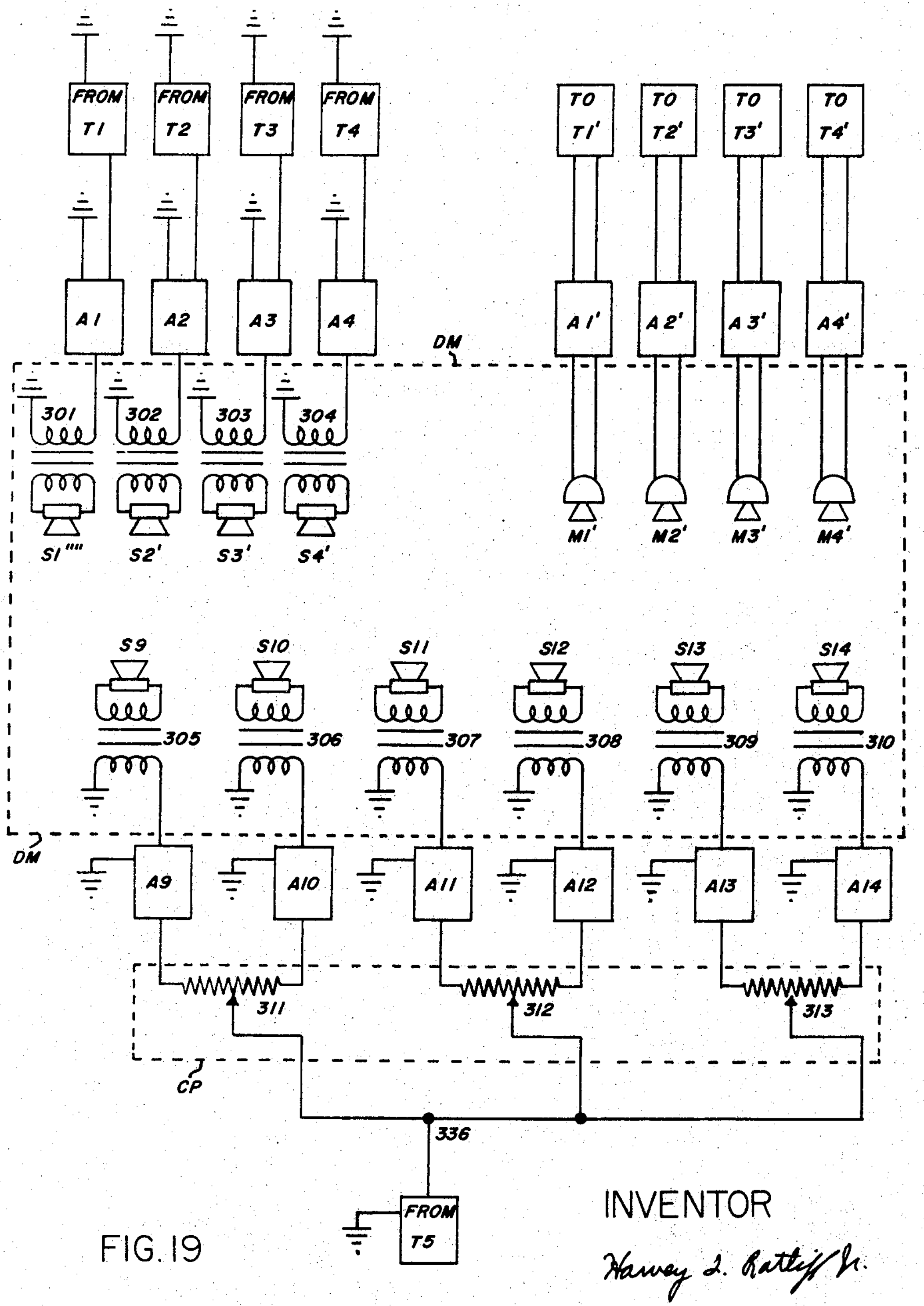
FIG. 19 is a schematic diagram showing the electronics involved in the "directional mixing" process of the invention.

Sound from sound track T1 is applied to the control grid of the first stage of amplifier system A1, is amplified and applied from the plate of the last stage of A1 to the input coil of transformer 301 for speaker S1'''' of FIGS. 18 and 19. Speaker system S1'''' could of course consist of the well known "woofer" and "tweeter" speakers as described above (so could speaker systems S2', S3', S4', S9, S10, S11, S12, S13, and S14). Similarly sound from tracks T2, T3, and T4 is applied to the control grid of the first stage of amplifier systems A2, A3, and A4 respectively, is amplified and applied from the plate of the last stage of A2, A3, and A4 respectively to the input coil of transformers 302, 303, and 304 respectively for speakers S2', S3' and S4' respectively of FIGS. 18, and 19. In this manner the sound (including its directional components) recorded on tracks T1, T2, T3, and T4 is reproduced in directional mixing room DM of FIGS. 18 and 19.

Reference is made to FIG. 19.

In order to give the sound from T5 direction, the signal from T5 is applied through three volume controls 311, 312, and 313. This may of course be done through an amplifier system not shown. Volume control 311 may be varied by 315 of FIG. 20 such that nearly all of the sound signal from T5 at 311 is applied to the control grid of the first stage of amplifier system A9, such that nearly all of the sound signal from T5 at 311 is applied to the control grid of the first stage of amplifier system A10, or any where between these two extremes. In the contemplated form of the invention when rod 315 is all the way back the +Z component of sound emitted from speaker S9 will be extremely strong, and the −Z component of sound emitted from speaker S10 will be extremely weak; when rod 315 is all the way forward the +Z component of sound emitted from speaker S9 will be extremely weak, and the −Z component of sound emitted from speaker S10 will be extremely strong; when rod 315 is half way (or approximately half way) between these two extremes the +Z component of sound emitted from speaker S9 will equal the −Z component of sound emitted from speaker S10; etc.

Figures 20, 22:
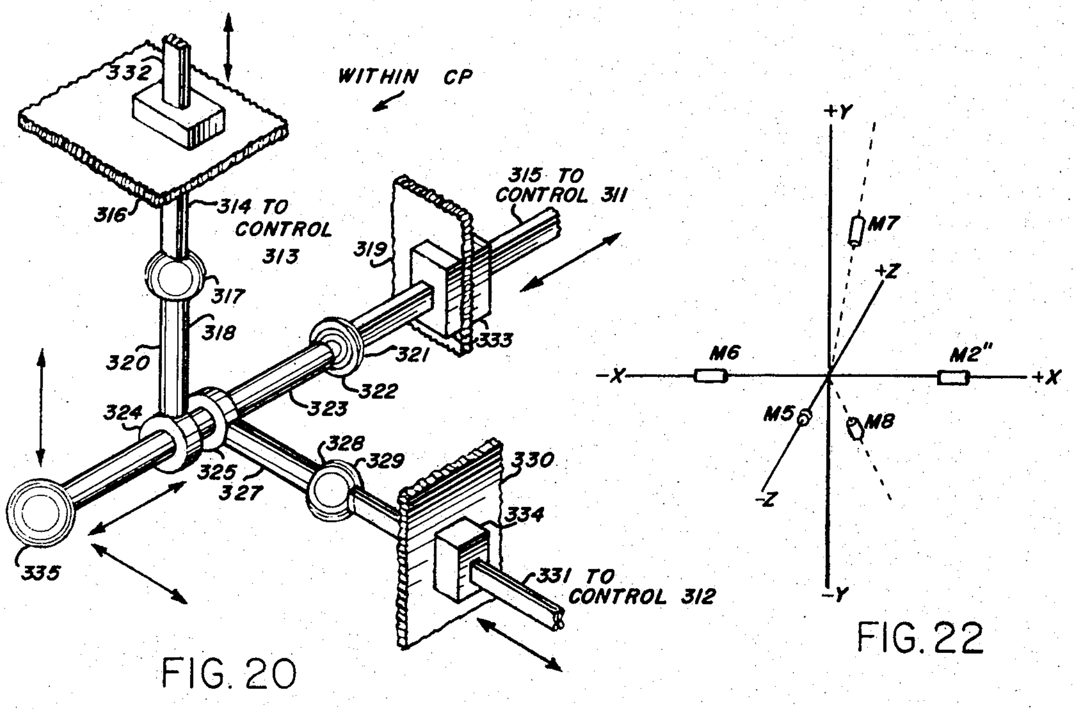
FIG. 20 is an elevational view of an apparatus used in the "directional mixing" process of the invention.
FIG. 22 is an elevational view showing the spatial relationship of the microphones of FIG. 21.

Volume control 312 may be varied by 331 of FIG. 20 such that nearly all of the sound signal from T5 at 312 is applied to the control grid of the first stage of amplifier system A11, such that nearly all of the sound signal from T5 at 312 is applied to the control grid of the first stage of amplifier system A12, or anywhere between these two extremes. In the contemplated form of the invention, when rod 331 is all the way to the right the +X component of sound emitted from speaker S11 will be extremely weak, and the −X component of sound emitted from speaker S12 will be extremely strong; when rod 331 is all the way to the left the +X component of sound emitted from speaker S11 will be extremely strong, and the −X component of sound emitted from speaker S12 will be extremely weak; when rod 331 is half way (or approximately half way) between these two extremes the +X component of sound emitted from speaker S11 will equal the −X component of sound emitted from speaker S12; etc.

Volume control 313 (of FIG. 19) may be varied by 314 of FIG. 20 such that nearly all of the sound signal from T5 at 313 is applied to the control grid of the first stage of amplifier system A13, such that nearly all of the sound signal from T5 at 313 is applied to the control grid of the first stage of amplifier system A13, or anywhere between these two extremes. In the contemplated form of the invention when rod 314 is all the way down the +Y component of sound emitted from speaker S13 will be extremely strong, and the −Y component of sound emitted from speaker S14 will be extremely weak; when rod 314 is all the way up the +Y component of sound emitted from speaker S13 will be extremely weak, and the −Y component of sound emitted from speaker S14 will be extremely strong; when rod 314 is half way (or approximately half way) between these two extremes the +Y component of sound emitted from speaker S13 will equal the −Y component of sound emitted from speaker S14; etc.

The output from the plate of the final stage of amplifier systems A9, A10, A11, A12, A13, and A14 is applied to the input coils of transformers 305, 306, 307, 308, 309, and 310 respectively for speakers S9, S10, S11, S12, S13, and S14 respectively within directional mixing room DM (FIGS. 18 and 19).

The sound (including its directional components) thusly created in directional mixing room DM is picked up by microphones M1', M2', M3', and M4', amplified by amplifiers A1', A2', A3', and A4' respectively, recorded on four new sound tracks T1', T2', T3', and T4' respectively, and monitored by VO of FIG. 16(*a*) through speakers S6, S7, S2, and S8 (if the KD set of FIGS. 13(*a*) and 14(*a*) is used) or S1', S1'', S1''', S2, S3, and S4 (if the KD set of FIGS. 13 and 14 is used) and speaker S5B and S5T (of FIG. 16(*a*)). The circuitry required for this monitoring is obvious from either FIG. 15 or FIG. 17 and the explanation thereof given above.

Reference is now made to FIG. 20. Within control panel CP there are various controls (such as a well known form of a general volume control not shown) and the directional control device of FIG. 20. Rod 315 is allowed to move only in the direction of the arrow (forward and backward) by element 333 supported by housing panel 319. Rod 331 is allowed to move only in the direction of the arrow (to the right and to the left) by element 334 supported by housing panel 330. Rod 314 is allowed to move only in the direction of the arrow (upward and downward) by element 332 supported by housing panel 316. Rods 315, 331, and 314 are rigidly secured to sockets 321, 329, and 317 respectively which support balls 322, 328 and 318 respectively which are free to rotate any direction therein. Balls 322, 328, and 318 are rigidly secured to rods 323, 327, and 320 respectively. Cylindrical elements 324 and 325 are free to rotate about rod 323 or to move in either direction along the axis of rod 323 but are held from other movements, and are rigidly secured to rods 320 and 327 respectively. Control knob 335 is rigidly secured to rod 323. It may be seen that knob 335 may be moved in the direction of the arrows or in any lateral direction. Therefore "sound director" VO (of FIG. 16(*a*)) may with one hand move rod 315 forward or backward, rod 331 to the right or to the left, and rod 314 up or down with a single movement, thereby changing the intensity emitted by each of the six speakers (S9, S10, S11, S12, S13, and S14). While he is doing this with his right hand he could be using his left hand for anything else (such as controlling the "on-off switch" or controlling the general volume level). It is here pointed out that the rotation of rod 323 by knob 335 could be used to control the general intensity level by controlling a variable resistor in the control grid circuit of an amplifier stage of an amplifier system between sound source T5 and terminal 336 (not shown).

Therefore, "sound director" VO may create any directional effect he desires from sound record T5, directionally combine it with the directionally emitted sound from four original tracks T1, T2, T3, and T4, record this combination on four new sound tracks T1', T2', T3', and T4', and monitor exactly what is recorded on T1', T2', T3', and T4' as the recording takes place.

After this procedure is carried out it is obvious that sound from a different record or sound track may be combined with the sound from T1', T2', T3', and T4' as the sound from T5 was combined with the sound from T1, T2, T3, and T4 described above. This may be done several times. One time for background music, another time for sound recorded from directional microphones etc.

Figure 21:
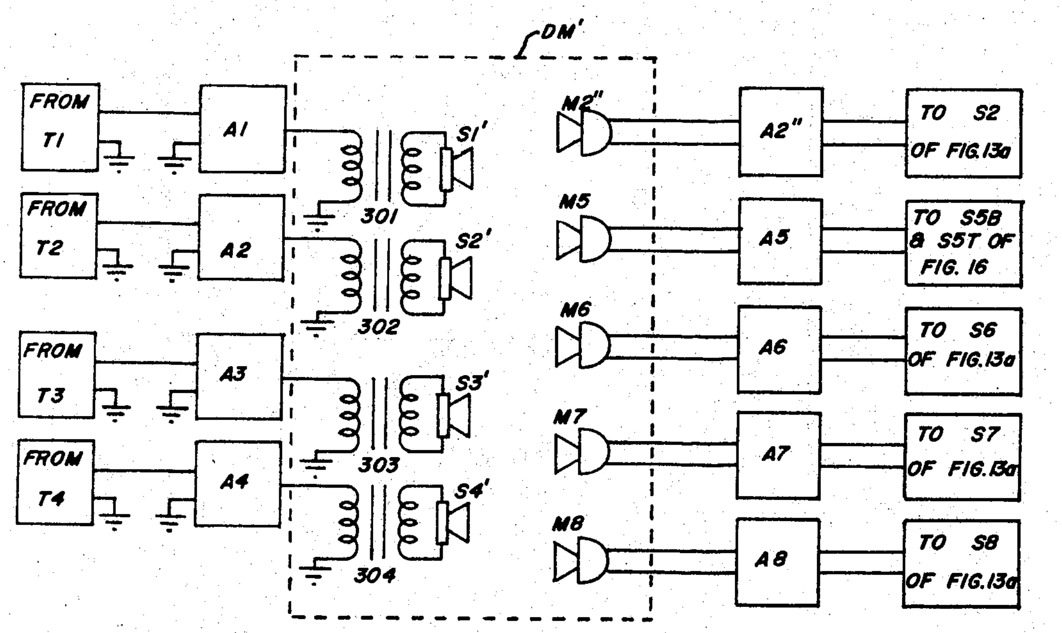
FIG. 21 is a schematic diagram of a stereophonic reproduction system involved in the invention.

A modified method of directionally reproducing the sound from tracks T1, T2, T3, and T4 through speakers S2, S6, S7, and S8 of FIG. 13(*a*) and speakers S5B and S5T of FIG. 16 will now be described. Reference is now made to FIGS. 18, 21, and 22. Directional mixing room DM' of FIG. 21 is constructed essentially the same as directional mixing room DM of FIG. 18. Speakers S1'''', S2', S3', and S4' are placed the same in DM' as they are in DM. In DM' speakers S9, S10, S11, S12, S13, and S14 and microphones M1', M2', M3', and M4' are removed (do not exist). In DM' microphones M2'', M5, M6, M7, and M8 are placed as shown in FIG. 22 relative to the origin and the +Z, −Z, +X, −X, +Y and −Y axis defined in the discussion of FIGS. 1 and 3 and shown also in FIGS. 18 and 22. Microphone M2'' is along the +X axis facing away from the origin 0 and some 10 inches therefrom. Microphone M5 is along the −Z axis facing away from the origin 0 and some 10 inches therefrom. Microphone M6 is along the −X axis, facing away from the origin 0 and some 10 inches therefrom. Microphone M7 is along an axis which bisects the +Z and +Y axis, facing away from the origin 0 and some 15 inches therefrom. Microphone M8 is along an axis which bisects the +Z and −Y axis, facing away from the origin 0 and some 15 inches therefrom. The electronic for speakers S1'''', S2', S3', and S4' of DM' is the same as it is for speakers S1'''', S2', S3', and S4' of DM (described above). The sound intensity picked up by M2'' is converted into electrical impulses (by M2'') which are amplified by A2'' and applied to speaker S2 of FIGS. 13(*a*) and 14(*a*) to reproduce the +X component of sound for any VO properly viewing into a KD set. The sound intensity picked up by M5 is converted into electrical impulses (by M5) which are amplified by A5 and applied to speakers S5B and S5T of FIG. 16 to reproduce the −Z component of sound for any VO in the auditorium. The sound intensity picked up by M6 is converted into electrical impulses (by M6) which are amplified by A6 and applied to speaker S6 of FIGS. 13(*a*) and 14(*a*) to reproduce the −X component of sound for any VO properly viewing into a KD set within the auditorium. The sound intensity picked up by M7 is converted into electrical impulses (by M7) which are amplified by A7 and applied to speaker S7 of FIGS. 13(*a*) and 14(*a*) to reproduce the +Y component and part of the +Z component of sound for any VO properly viewing into a KD set within the auditorium. And the sound intensity picked up by M8 is converted into electrical impulses (by M8) which are amplified by A8 and applied to speaker S8 of FIGS. 13(*a*) and 14(*a*) to reproduce the −Y component and the other part of the +Z component of sound for any VO properly viewing into a KD set within the auditorium. When this system is used, each KD set of FIGS. 13(*a*) and 14(*a*) is calibrated in a manner which is obvious from the calibration procedures described above. It is here pointed out that the microphones of FIG. 22 and the speakers which correspond thereto could be arranged in a different manner without departing from this invention. Also there could be 6, 7, etc. microphones with corresponding speakers similar to those of FIGS. 13(*a*), 16, and 22. The eight speaker system of my prior application Ser. No. 250,562 could be used in conjunction with the four sound tracks of this invention by the use of a mixing room similar to DM'.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

What I claim is:

1. A theater; a multiplicity of individualized, non-enclosed areas within said theater, each individualized area having substantially the same configuration with corresponding points therein and with the distance between adjacent areas substantially greater than the distance between the corresponding points in an area; speaker supporting apparatus at said corresponding points in each said area; a set of individualized stereophonic speakers with the corresponding speakers thereof at the respective said corresponding points and supported by said supporting apparatus, the speakers within each area coacting among themselves to produce substantially the same stereophonic effect in every area with only negligible effect on adjacent areas; a set of theatrical, high fidelity speakers acting as a unified sound unit, supported by a surface of said theater and coacting with said individualized stereophonic speakers of each respective said area whereby the combined effect increases the stereophonic quality and the tonal quality at each respective individualized area; means of conveying respective component sound signals to each corresponding respective individualized speaker and a component high fidelity sound signal to all the combined theatrical speakers supported by said surface, each component signal being respectively different in its directional orientation of a unified stereophonic creation, whereby the producing of substantially identical stereophonic and high fidelity sound conditions in each of said individualized areas recreates substantially identical and high fidelity stereophonic conditions for a large number of people in the theater and the independent support and arrangement of the speakers allows the listener freedom of movement without significantly effecting the re-created stereophonic directional effect.

2. The system of claim 1 wherein: said speaker supporting apparatus includes a kinescopic optical viewing device supported before the face of each listener at an area and said first set of speakers is made up of a first speaker supported at the top of each viewing device, a second speaker supported at the bottom of each viewing device, a third speaker supported at the right side of each viewing device, and a fourth speaker supported at the left side of each viewing device, whereby said first and second speaker coact to reproduce the upward and downward components of sound, said third and fourth speaker coact to reproduce the right and left components of sound, and said first, second, third and fourth speakers coact with said second set of speakers to reproduce the forward and rearward components of sound for each viewing observer viewing into a device.

3. The system of claim 1 wherein: said speaker supporting apparatus includes a kinescopic optical viewing device supported before the face of each listener at an area and said first set of speakers coact with said second set of speakers to reproduce the forward and rearward components of sound and said first set is made up of three right speakers at the right side of each viewing device coacting with three left speakers at the left side of each viewing device to reproduce the right and left components of sound with the top and bottom speakers on a side coacting to reproduce the upward and downward components of sound for each viewing observer viewing into a device.

References Cited

UNITED STATES PATENTS

| | | | |
|---|---|---|---|
| 1,435,339 | 11/1922 | Schweyer | 179—1 |
| 1,850,130 | 3/1932 | Gannett | 179—1 |
| 2,655,564 | 10/1953 | Holt-Seeland. | |
| 3,082,295 | 3/1963 | Marson | 179—100.1 |
| 3,158,695 | 11/1964 | Camras | 179—100.1 |
| 1,964,879 | 7/1934 | Jeliner | 352—129 |
| 2,826,112 | 3/1958 | Mueller | 352—129 |

KATHLEEN H. CLAFFY, *Primary Examiner.*

DAVID G. REDINBAUGH, *Examiner.*

J. McHUGH, A. H. GESS, *Assistant Examiners.*